US010769189B2

(12) United States Patent
Dotan-Cohen et al.

(10) Patent No.: US 10,769,189 B2
(45) Date of Patent: Sep. 8, 2020

(54) COMPUTER SPEECH RECOGNITION AND SEMANTIC UNDERSTANDING FROM ACTIVITY PATTERNS

(71) Applicant: MICROSOFT TECHNOLOGY LICENSING, LLC, Redmond, WA (US)

(72) Inventors: Dikla Dotan-Cohen, Herzliya (IL); Shira Weinberg, Tel Aviv (IL)

( * ) Notice: Subject to any disclaimer, the term of this patent is extended or adjusted under 35 U.S.C. 154(b) by 364 days.

(21) Appl. No.: 15/087,224

(22) Filed: Mar. 31, 2016

(65) Prior Publication Data
US 2017/0140041 A1    May 18, 2017

Related U.S. Application Data

(63) Continuation-in-part of application No. 14/941,155, filed on Nov. 13, 2015.

(51) Int. Cl.
*G06F 16/335* (2019.01)
*G06F 16/957* (2019.01)
(Continued)

(52) U.S. Cl.
CPC .......... *G06F 16/335* (2019.01); *G06F 16/957* (2019.01); *G06F 40/30* (2020.01);
(Continued)

(58) Field of Classification Search
CPC ........... G06F 17/30699; G06F 17/2785; G06F 16/335
(Continued)

(56) References Cited

U.S. PATENT DOCUMENTS 6,567,778 B1    5/2003  Chao Chang et al.
8,019,602 B2    9/2011  Yu et al.
(Continued)

FOREIGN PATENT DOCUMENTS

EP    2541474 A1    1/2013

OTHER PUBLICATIONS

Yan, et al., "Fast App Launching for Mobile Devices using Predictive User Context", In Proceedings of 10th International Conference on Mobile Systems, Applications, and Services, Jun. 25, 2012, pp. 1-14.
(Continued)

*Primary Examiner* — Kimberly L Wilson
(74) *Attorney, Agent, or Firm* — Shook, Hardy & Bacon LLP

(57) ABSTRACT

A user activity pattern may be ascertained using signal data from a set of computing devices. The activity pattern may be used to infer user intent with regards to a user interaction with a computing device or to predict a likely future action by the user. In one implementation, a set of computing devices is monitored to detect user activities using sensors associated with the computing devices. Activity features associated with the detected user activities are determined and used to identify an activity pattern based on a plurality of user activities having similar features. Examples of user activity patterns may include patterns based on time, location, content, or other context. The inferred user intent or predicted future actions may be used to facilitate understanding user speech or determining a semantic understanding of the user.

20 Claims, 9 Drawing Sheets

(51) Int. Cl.
| | |
|---|---|
| *H04W 4/029* | (2018.01) |
| *H04W 4/021* | (2018.01) |
| *G06Q 10/10* | (2012.01) |
| *G06Q 10/04* | (2012.01) |
| *G06F 40/30* | (2020.01) |
| *H04W 4/18* | (2009.01) |
| *H04W 4/02* | (2018.01) |
| *H04W 4/08* | (2009.01) |

(52) U.S. Cl.
CPC ........... *G06Q 10/04* (2013.01); *G06Q 10/101* (2013.01); *H04W 4/021* (2013.01); *H04W 4/029* (2018.02); *H04W 4/18* (2013.01); *H04W 4/023* (2013.01); *H04W 4/027* (2013.01); *H04W 4/08* (2013.01)

(58) Field of Classification Search
USPC ......................................................... 707/721
See application file for complete search history.

(56) References Cited

U.S. PATENT DOCUMENTS

| | | | |
|---|---|---|---|
| 8,185,524 | B2 | 5/2012 | Weber et al. |
| 8,566,087 | B2 | 10/2013 | Cross, Jr. et al. |
| 8,606,889 | B2 | 12/2013 | Kazan et al. |
| 8,731,902 | B2 | 5/2014 | Beld et al. |
| 8,738,377 | B2 | 5/2014 | Byrne et al. |
| 8,886,540 | B2 | 11/2014 | Cerra et al. |
| 9,904,356 | B2 * | 2/2018 | Laughlin ................. G06F 3/017 |
| 2006/0206333 | A1 | 9/2006 | Paek et al. |
| 2007/0299631 | A1 | 12/2007 | Macbeth et al. |
| 2009/0164395 | A1 | 6/2009 | Heck |
| 2011/0022443 | A1 | 1/2011 | Partridge et al. |
| 2012/0089605 | A1 | 4/2012 | Bangalore et al. |
| 2012/0209839 | A1 | 8/2012 | Andrews et al. |
| 2013/0006678 | A1 | 1/2013 | Bellotti et al. |
| 2013/0067170 | A1 | 3/2013 | Lam |
| 2013/0097246 | A1 | 4/2013 | Zifroni et al. |
| 2013/0110623 | A1 | 5/2013 | Kilroy et al. |
| 2013/0173513 | A1 | 7/2013 | Chu et al. |
| 2013/0254685 | A1 | 9/2013 | Batraski et al. |
| 2014/0032468 | A1 | 1/2014 | Anandaraj |
| 2014/0122697 | A1 | 5/2014 | Liu et al. |
| 2014/0128105 | A1 | 5/2014 | Su et al. |
| 2014/0257811 | A1 | 9/2014 | Lavallee |
| 2014/0258188 | A1 | 9/2014 | Chen et al. |
| 2014/0310595 | A1 * | 10/2014 | Acharya ................. G06F 9/453 715/706 |
| 2014/0337037 | A1 | 11/2014 | Chi |
| 2014/0372356 | A1 | 12/2014 | Bilal et al. |
| 2014/0377727 | A1 | 12/2014 | Yom-tov et al. |
| 2015/0025890 | A1 | 1/2015 | Jagatheesan et al. |
| 2015/0154954 | A1 | 6/2015 | Sharifi |
| 2015/0186156 | A1 * | 7/2015 | Brown ..................... G06F 9/453 715/706 |
| 2015/0323974 | A1 | 11/2015 | Shuster et al. |
| 2015/0338917 | A1 * | 11/2015 | Steiner ................ H04M 1/7253 345/156 |
| 2016/0050589 | A1 | 2/2016 | Safavi |
| 2016/0055236 | A1 | 2/2016 | Frank et al. |
| 2016/0350812 | A1 | 12/2016 | Priness et al. |
| 2017/0031575 | A1 | 2/2017 | Dotan-cohen et al. |
| 2017/0046124 | A1 * | 2/2017 | Nostrant ................ G10L 15/16 |
| 2017/0140285 | A1 | 5/2017 | Dotan-cohen et al. |
| 2018/0183243 | A1 | 6/2018 | Lachman |

OTHER PUBLICATIONS

Zou, et al., "Prophet: What App You Wish to Use Next", In Proceedings of ACM Conference on Pervasive and Ubiquitous Computing, Sep. 8, 2013, pp. 167-170.
Huang, et al., "Predicting Mobile Application Usage Using Contextual Information", In Proceedings of 14th ACM International Conference on Ubiquitous Computing, Sep. 5, 2012, 7 pages.
Choi, et al., "Personalized Application Recommendations Based on Application Usage and Location", In Publication of Springer Netherlands, Oct. 13, 2015, 2 pages.
"The Leap from Context to Hyper-Context to add Value to the Consumer", Published on: Dec. 2, 2014 Available at: http://pn.ispirt.in/the-leap-from-context-to-hyper-context-to-add-value-to-the-consumer/.
Park, et al., "Location-Based Recommendation System Using Bayesian User's Preference Model in Mobile Devices", In Proceedings of 4th International Conference on Ubiquitous Intelligence and Computing, Jul. 11, 2007, pp. 1130-1139.
Wu, et al., "User Model of a Personal Assistant in Collaborative Design Environments", In Proceedings of First International Workshop on Agents in Design, Aug. 29, 2002, pp. 39-54.
Schneiderman, Ron, "Accuracy, Apps Advance Speech Recognition", In Journal of IEEE Signal Processing Magazine, vol. 32, Issue 1, Jan. 2015, 4 pages.
"International Search Report and Written Opinion Issued in PCT Application No. PCT/US2016/060747", dated Jan. 16, 2017, 16 Pages.
Shin, et al., "Understanding and Prediction of Mobile Application Usage for Smart Phones", In Proceedings of the ACM Conference on Ubiquitous Computing, Sep. 5, 2012, 10 Pages.
Srinivasan, et al., "MobileMiner: Mining Your Frequent Patterns on Your Phone", In Proceedings of International Joint Conference on Pervasive and Ubiquitous Computing, Sep. 13, 2014, 12 Pages.
Xuy, et al., "Preference, Context and Communities: A Multi-faceted Approach to Predicting Smartphone App Usage Patterns", In Proceedings of the International Symposium on Wearable Computers., Sep. 19, 2013, 7 Pages.
Zhang, et al., "mFingerprint: Privacy-Preserving User Modeling with Multimodal Mobile Device Footprints", In Proceedings of 7th International Conference on Social Computing, Behavioural-Cultural Modelling and Prediction., Apr. 1, 2014, 9 Pages.
"International Search Report and Written Opinion Issued in PCT Application No. PCT/US2016/060531", dated Jan. 19, 2017, 13 Pages.
"Second Written Opinion Issued in PCT Application No. PCT/US2016/060531", dated Oct. 25, 2017, 6 Pages.
"International Preliminary Report on Patentability Issued in PCT Application No. PCT/US2016/060531", dated Feb. 7, 2018, 9 Pages.
"Non-Final Office Action Issued in U.S. Appl. No. 14/941,155", dated Dec. 31, 2018, 43 Pages.
"Final Office Action Issued in U.S. Appl. No. 14/941,155", dated Jun. 25, 2019, 40 Pages.
"Non Final Office Action Issued in U.S. Appl. No. 14/941,155", dated Dec. 11, 2019, 45 Pages.
"Office Action Issued in European Patent Application No. 16806323.8", dated Feb. 17, 2020, 10 Pages.
"Office Action Issued in European Patent Application No. 16795525.1", dated Feb. 24, 2020, 12 Pages.
"Final Office Action Issued in U.S. Appl. No. 14/941,155", dated Apr. 9, 2020, 51 Pages.

* cited by examiner

COMPUTER SPEECH RECOGNITION AND SEMANTIC UNDERSTANDING FROM ACTIVITY PATTERNS

CROSS REFERENCE TO RELATED APPLICATIONS

This application is a continuation-in-part application and claims the benefit of U.S. application Ser. No. 14/941,155, titled "Enhanced Computer Experience From Activity Prediction," filed Nov. 13, 2015, which is hereby expressly incorporated by reference in its entirety.

BACKGROUND

People are increasingly interacting with computing devices and relying on these devices for information, recommendations, and other services to assist them in their day-to-day tasks. But understanding the user's spoken words and intent by the computing device in these interactions remains a difficult technical problem. In such interactions, users are often left frustrated by the inability of their computerized personal assistant applications or services to understand them, their intent, or anticipate their needs.

At the same time, many users of computing devices have repeating patterns of usage. For example, a user may launch an email app on their mobile device every workday morning, before starting work, browse to a favorite news website over lunchtime, call a close friend or family member on their drive home from work, or use their laptop computer to plan their annual summer vacation around May. By learning these patterns of user activity, the computerized personal-assistant applications and services can provide improved user experiences including improved understanding of the user's speech and the user's intent.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards understanding user speech and inferring user intent regarding user interactions performed via the user's computing devices. In particular, embodiments may determine a likely spoken utterance or intent of a user with regards to an interaction with a computing device, or may predict a likely future action to be performed by a user, based on a history of sensed user activity. Data corresponding to user activity may be gathered over time using sensors of one or more of the user's computing devices. From this historical user activity information, a computer system may learn user activity patterns associated with the computing devices. By analyzing a user activity pattern, future user actions may be predicted or user intent may be inferred.

For example, computing devices associated with a user ("user devices") may employ one or more sensors to generate data relevant to a user's activity on a user device(s). The user activity may be monitored, tracked, and used for determining patterns of user activity. Examples of user activity patterns may include, without limitation, activity patterns based on time, location, content, or other context, as described herein. In some embodiments, the activity patterns may be determined based on user activity related to browsing, application usage, or other related user activities associated with one or more user devices or user activity otherwise determinable via the one or more user devices.

Based on the determined patterns of user activity, user intent may be inferred regarding user interactions with a computing device, and/or predictions of user activity determined and used to provide improved user experiences. Examples of improved user experiences, which are further described herein, may include improved speech recognition or improved semantic understanding of the user, which may be used for more accurately resolving, disambiguating, and/or understand a user's speech, or other aspects of understanding input from the user and related enhanced computer experiences such as personalization. In some embodiments, the user activity patterns, or the inferred intent or predictions of future activity determined therefrom, may be made available to one or more applications and services that consume this information to provide an improved user experience. Some embodiments may be incorporated into (or operate in conjunction with) an automatic speech recognition (ASR) and/or language modeling component or service. In this manner, operating in conjunction with (or as a component of) the speech recognition and interpretation operation, the user's utterance may be resolved in such a manner as to be consistent with learned patterns of user activity.

Accordingly, as will be further described, in one embodiment, one or more user devices associated with a user may be identified and monitored for user activity. In some embodiments user activity monitoring may be facilitated using an application or service that runs on the monitored user device. User actions or "activity events", such as visiting a website, launching an application, or other actions similar to those described herein, may be detected and logged with associated contextual data; for example, by logging the observed user action with a timestamp, location stamp, and/or associating the activity event with other available contextual information. From the logged user activity, historical user activity information may be determined and provided to an inference engine. Based on an analysis of historical user activity, a user activity pattern may be determined. In some embodiments, a semantic analysis is performed on the activity events and associated information to characterize aspects of the activity event. The semantic analysis may be used to characterize information associated with the activity event and may provide other relevant features of the activity events that may be used to identify patterns.

The user activity patterns may be used to infer user intent or predict future activity of the user. From these predictions or inferred user intent, various implementations may provide personalized computing experiences and other services tailored to the user, such as improved speech recognition; incorporation of the user's routine into recommendations and notifications; improved semantic understanding by the user's computer devices, or other examples as described herein. In this way, embodiments of the disclosure improve the operation of the computing device and thus provide more accurate speech recognition, improved resolution and disambiguation, a more accurate understanding of the user's intent, and thus an improved user experience with the computing device.

BRIEF DESCRIPTION OF THE DRAWINGS

Aspects of the disclosure are described in detail below with reference to the attached drawing figures, wherein.

DETAILED DESCRIPTION

Figure 1:
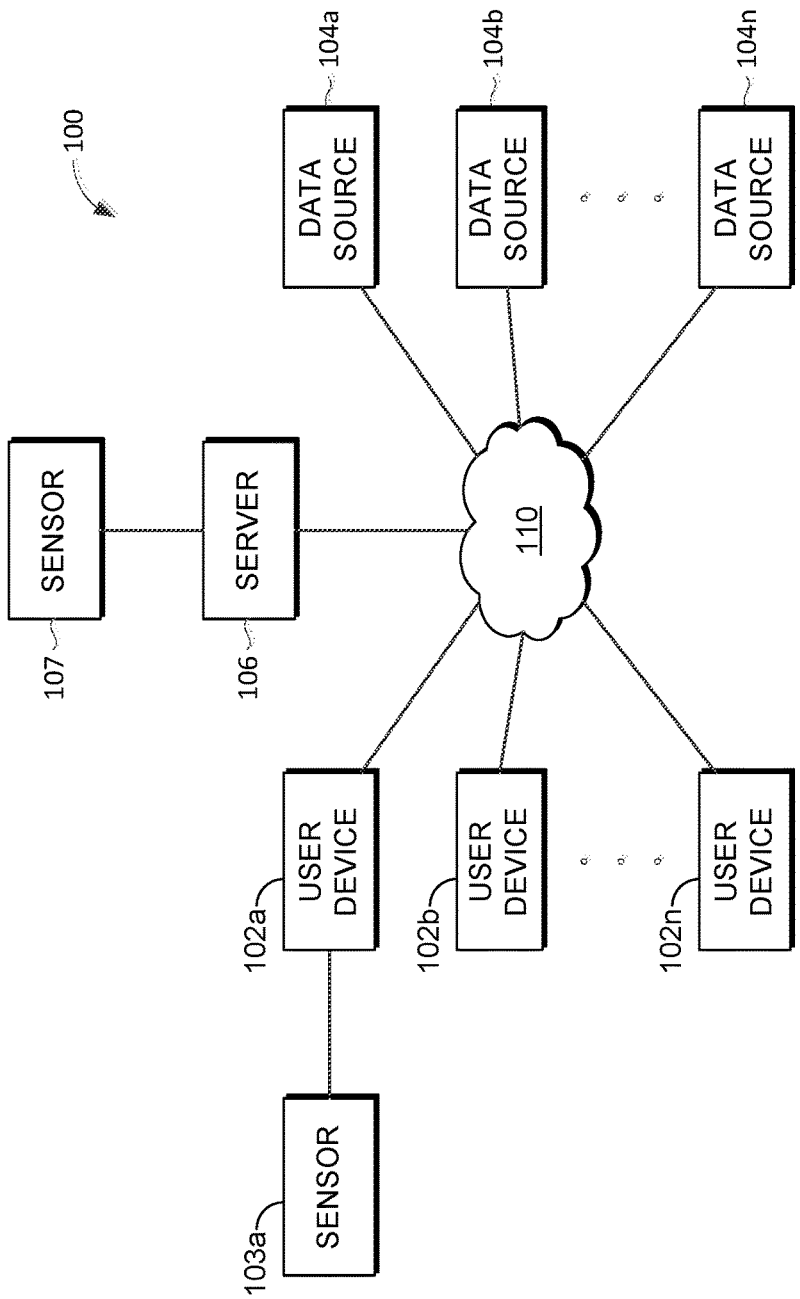
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to understanding user speech and inferring user intent associated with user-interactions with computing devices. In particular, embodiments described herein may determine a likely spoken utterance or intent of a user with regards to an interaction with a user device, may predict a likely future action by a user, based on a history of sensed user activity. Data corresponding to user activity may be gathered over time using sensors on one or more user devices associated with the user. From this historical user activity information, a computer system may learn user activity patterns associated with the user devices. By analyzing a user activity pattern, future user actions may be predicted or user intent may be inferred. In some cases, the user activity pattern may be analyzed along with sensor data collected by a user device, and the user' intent inferred based on determining a likely intent that consistent with determined user activity pattern.

As further described herein, in some embodiments, user devices may employ one or more sensors to generate data relevant to a user's activity via a user device(s). The user activity may be monitored, tracked, and used for determining user activity patterns. The term "activity pattern" is used broadly herein and may refer to a plurality of user interactions conducted using one or more user devices, activity by the user on or in connection to one or more user devices, events (including actions) related to user activity, or any type of user activity determinable via a computing device, wherein the plurality of interactions, actions, events, or activity share common features or characteristics. In some embodiments, these in-common features or variables may comprise features characterizing a user activity, time, location or other contextual information associated with the user activity, as further described herein. Examples of user activity patterns may include, without limitation, activity patterns based on time (e.g. the user browses his bank's website near the beginning of each month to check his account balance), location (e.g. upon arriving at work in the morning, a user the user turns down the volume on her phone), content (e.g. a user typically browses news-related websites followed by their social-media related websites), or other context, as described herein.

In some embodiments, the user activity may be related to a user's browsing activity, such as websites, categories or websites and/or website categories visited by a user, and user activity associated with the browsing activity. In addition or alternatively, the user activity may be related to a user's application (or app) related activity, such as application usage, which may include usage duration, launches, files accessed via the application or in conjunction with the application usage, or content associated with the application. The term application or app is used broadly herein, and generally refers to a computer program or computer application, which may comprise one or more programs or services, and may run on the user's device(s) or in the cloud.

Based on the determined patterns of user activity, user intent may be inferred, regarding user interactions with a computing device, or predictions of user activity determined and used to provide improved user experiences. Examples of these improved user experiences, which are further described below, include personalization services, such as tailoring content for the user, improved speech recognition or improved semantic understanding of the user, which may be used for performing disambiguation or other aspects of understanding input from the user. In some embodiments, the user activity patterns, or the inferred intent or predictions of future activity determined therefrom, may be made available to one or more applications and services that consume this information and provide an improved user experience, such as a voice-controlled user interface, which may be a component of a vehicle, smart appliance, or other devices for which it is beneficial to have a semantic understanding of the user intent, or may be incorporated into a language model or spoken language understanding model (SLU), or similar computer process, component, or service. In one embodiment, the activity pattern information may be provided via an API so that third-party applications and services can use it, such as by providing speech-to-text services, voice operation or control, timely recommendations, suggestions or other information or services relevant to the user based on the learned activity patterns. One embodiment may be incorporated into (or operate in conjunction with) an automatic speech recognition (ASR) and/or language modeling component or service. In this manner, operating in conjunction with (or as a component of) the speech recognition and interpretation operation, the user's utterance may be resolved in such a manner as to be consistent with learned patterns of user activity. Such embodiments can provide a significant advantage to personal digital assistant services and an improvement to the technology of speech recognition and understanding by enabling computer-recognized speech functionality to "learn" or evolve to understand the user.

Accordingly, at a high level, in one embodiment, user data is received from one or more data sources. The user data may be received by collecting user data with one or more sensors or components on user device(s) associated with a user. Examples of user data, also described in connection to component 210 of FIG. 2, may include information about the user device(s), user-activity associated with the user devices (e.g., app usage, online activity, searches, calls, usage duration, and other user-interaction data), network-related data (such as network ID, connection data, or other network-related information), application data, contacts data, calendar and social network data, or nearly any other source of user data that may be sensed or determined by a user device or other computing device. The received user data may be monitored and information about the user activity may be stored in a user profile, such as user profile 240 of FIG. 2.

In some embodiments, based on an identification of one or more user devices, which may be determined from the user data, the one or more user devices are monitored for user activity. In some embodiments user activity monitoring may be facilitated using an application or service that runs on the monitored user device. Alternatively or in addition, the user activity monitoring may be facilitated using an application or service that runs in the cloud, which may scans the user device, or detects online activity associated with the user device, such as http requests or other communication information, or otherwise receive information about user activity from the user device.

User data may be analyzed to detect various features associated with user actions. Detected user actions or "activity events", which may include actions such as websites visited, applications launched, or other actions similar to those described herein, may be logged with associated contextual data; for example, by logging the observed user action with a corresponding timestamp, location stamp, and/or associating the activity event with other available contextual information. In some embodiments, such logging may be performed on each user device, so that activity patterns may be determined across devices. Further, in some embodiments, cloud-based user-activity information sources may be used such as online user calendars or user activities determined from social media posts, emails, or the like. These sources also may be used for providing other context to the user activity detected on the user devise(s). Examples of contextual information are further described in connection to contextual information extractor 284 in FIG. 2. In some embodiments, user activity logs from multiple user devices and available user activity information from cloud-based sources may be combined thereby representing a composite user activity history. The user activity logs, including corresponding contextual information, may be stored in a user profile associated with the user, such as user profile 240 of FIG. 2.

From the activity logs or user activity data, historical user activity information may be determined and provided to an inference engine. Based on an analysis of historical user activity, and in some cases current sensor data regarding user activity, a set of one or more likely user activity patterns may be determined. In particular, the inference engine may conduct an analysis of the historical user activity information to identify user activity patterns, which may be determined by detecting repetitions of similar user actions or routines, in some embodiments.

In some embodiments, a corresponding confidence weight or confidence score may be determined regarding the user activity patterns. The confidence score may be based on the strength of the pattern, which may be determined by the number of observations used to determine a pattern, how frequently the user activity is consistent with the pattern, the age or freshness of the activity observations, the number of features in common with the activity observations that make up the pattern, or similar measurements. In some instances, the confidence score may be considered when providing a personalized user experience or other improved user experience. Further, in some embodiments, a minimum confidence score may be needed before using the activity pattern to provide such experiences or other services. For example, in one embodiment, a threshold of 0.6 (or just over fifty percent) is utilized such that only activity patterns having a 0.6 (or greater) likelihood of predicting user activity may be considered. Nevertheless, where confidence scores and thresholds are used, determined patterns of user activity with confidence scores less than the threshold may still be monitored since additional observations of user activities may increase the confidence for a particular pattern.

In some embodiments, crowdsourced user activity history may also be utilized in conjunction with a user's own activity history. For example, for a given user, a set of other users similar to the given user may be identified, based on having features or characteristics in common with the given user. This might include other users located in proximity to the given users, the given user's social media friends, work colleagues (which may be determined from an analysis of contextual information associated with the given user), other users with similar users activity patterns, or the like. Information about user activity history from the other users may be relied upon for inferring patterns of user activity for the given user. This may be particularly useful in situations where little user activity history exists for the given user, such as where the user is a new user. In some embodiments, user activity information from similar users may be imputed to the new user until enough user history is available for the new user to determine statistically reliable user pattern predictions, which may be determined based on the number of observations included in the user activity history information or the statistical confidence of the determined user activity patterns, as further described herein. In some cases, where the user activity history comes from other users, the resulting inferred activity patterns for the given user may be assigned a lower confidence.

In some embodiments, a semantic analysis is performed on the activity events and associated information to characterize aspects of the activity event. For example, features associated with an activity event may be categorized (such as by type, similar timeframe or location, for example), and related features may be identified for use in determining a similarity or relational proximity to other activity events, such as by having one or more of the characteristics, including categories and related features, in common. In some embodiments, a semantic knowledge representation, such as a relational knowledge graph, may be employed. In some embodiments, the semantic analysis may use rules, logic such as associations or conditions, or classifiers.

The semantic analysis may also be used to characterize information associated with the activity event, such as determining that a location associated with the activity corresponds to a hub or venue of interest to the user based on frequency of visits, such as the user's home, work, gym, etc. (For example, the user's home hub may be determined to be the location where the user spends most of her time between 8 PM and 6 AM.) Similarly, the semantic analysis may determine time of day that correspond to working hours, lunch time, commute time, etc.

In this way, the semantic analysis may provide other relevant features of the activity events that may be used to determine patterns. For example, in addition to determining a particular website that the user visited at a certain time, such as visiting CNN.com over lunch, the category of the website may be determined, such as a news-related website. Similarly, the semantic analysis may categorize the activity as being associated with work or home, based on the characteristics of the activity (e.g. a batch of online searches about chi-squared distribution that occurs during working hours at a location corresponding to the user's office may be determined to be work-related activity, whereas streaming a movie on Friday night at a location corresponding to the user's home may be determined to be home-related activity). These aspects characterizing the user activity event then may be considered when evaluating the user activity history to identify patterns. For example, a pattern of visiting news-related websites over lunch may be determined where a user routinely visits news-related websites over lunch, but only occasionally visits CNN.com as one of the news-related websites.

As described previously, the user activity patterns may be used to infer user intent or predict future activity of the user. From these predictions or inferred user intent, various implementations may provide improved user experiences. For example, some embodiments may provide timely, relevant delivery or presentation of content, or modifying content that would otherwise be presented; incorporation of the user's routine into recommendations and notifications; improved speech recognition and improved semantic understanding by the user's computer devices, or other examples of improved user experiences described herein. For example, acoustic information corresponding to a user's speech, such as a spoken command, query, question, or other data from other user interactions with a user device (which may include visual information from a gesture that may be sensed by a sensor, such as a camera, associated with the user device) may be received and interpreted based on the historical user activity patterns. The information may be interpreted, for instance, to enable a personal assistant application to respond or invoke some action on behalf of the user (such as set a reminder, navigate to a website, locate a document for the user, or other tasks that may be carried out via the user device. Some embodiments may be carried out by a personal assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that environment 100 shown in FIG. 1 is an example of one suitable operating environment. Each of the components shown in FIG. 1 may be implemented via any type of computing device, such as computing device 900 described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 210 of FIG. 2.

Figure 2:
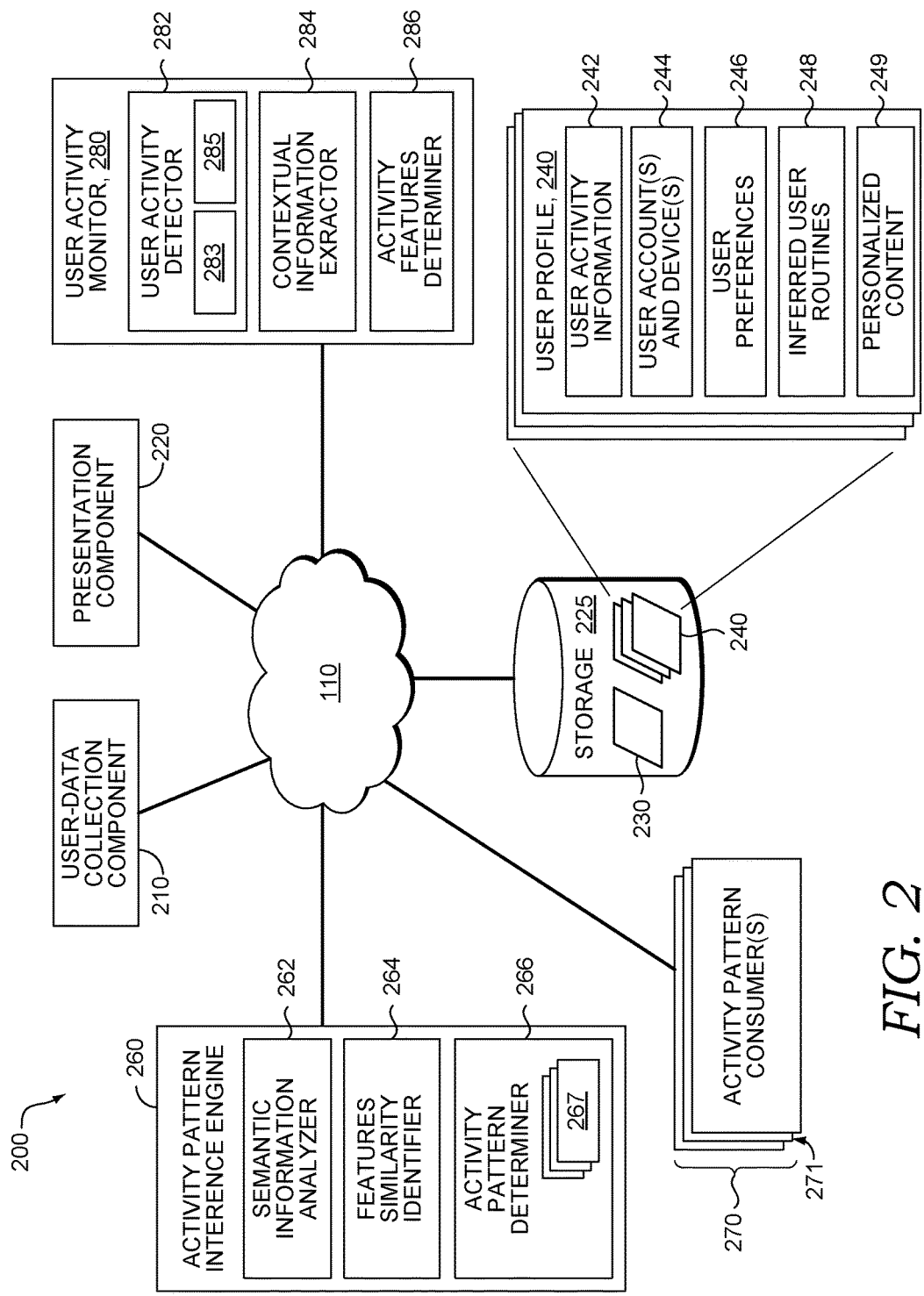
FIG. 2 is a diagram depicting an example computing architecture suitable for implementing aspects of the present disclosure.
Figure 3:
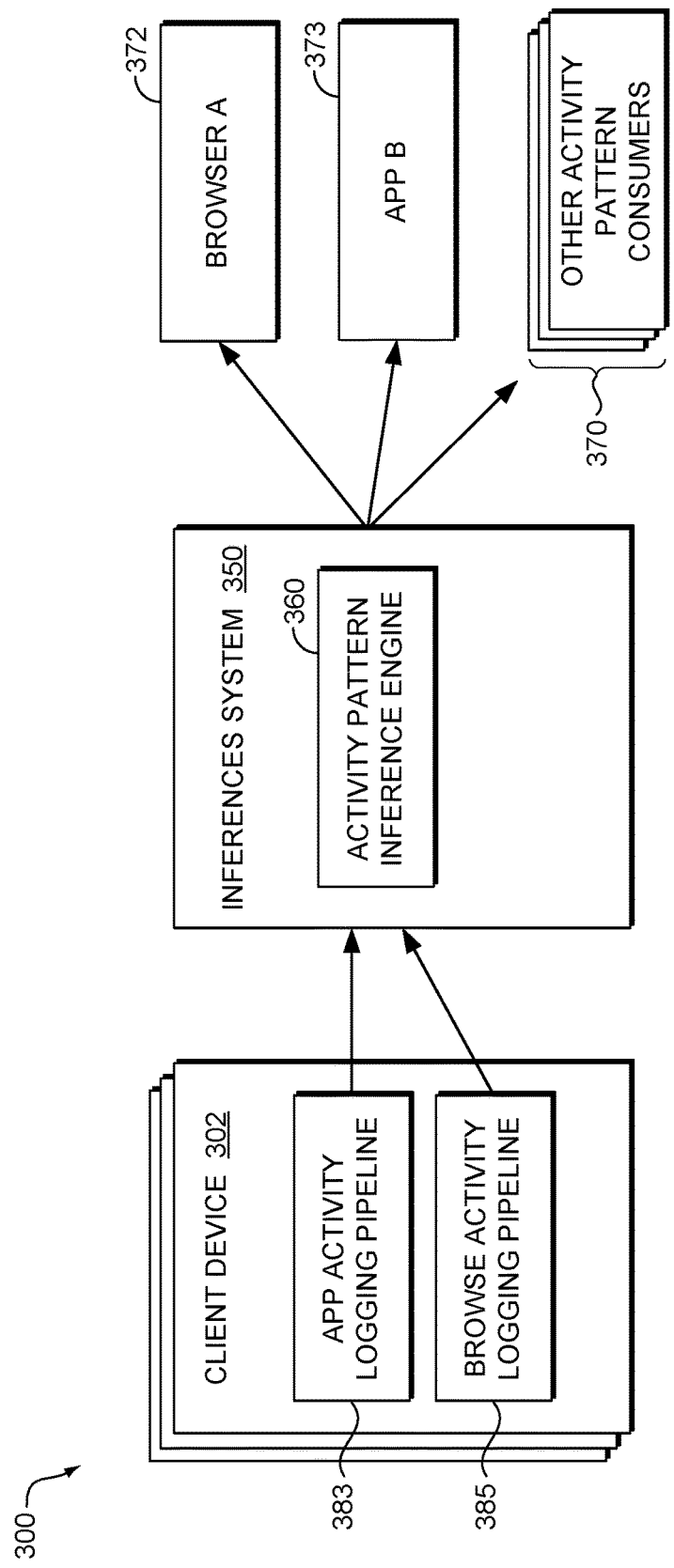
FIG. 3 illustratively depicts aspects of an example system for determining user activity patterns based on browser and application activity across multiple user devices, in accordance with an embodiment of the present disclosure.

Operating environment 100 can be utilized to implement one or more of the components of system 200, described in FIG. 2, and system 300, described in FIG. 3, including components for collecting user data, monitoring activity events, determining activity patterns, consuming activity pattern information to provide an improving user experience, generating personalized content, and/or presenting notifications and related content to users. Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, user activity monitor 280, activity pattern inference engine 260, activity pattern consumers 270, and storage 225. User activity monitor 280 (including its components 282, 284, and 286), activity pattern inference engine 260 (including its components 262, 264, 266, and 267), user-data collection component 210, presentation component 210, and activity pattern consumers 270 may be embodied as a set of compiled computer instructions or functions, program modules, computer software services, or an arrangement of processes carried out on one or more computer systems, such as computing device 900 described in connection to FIG. 9, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowd-sourced data) for user activity monitor 280, activity pattern inference engine 260, or an activity pattern consumer 270. The data may be received (or accessed), and optionally accumulated, reformatted and/or combined, by data collection component 210 and stored in one or more data stores such as storage 225, where it may be available to other components of system 200. For example, the user data may be stored in or associated with a user profile 240, as described herein. In some embodiments, any personally identifying data (i.e. user data that specifically identifies particular users) is either not uploaded or otherwise provided from the one or more data sources with user data, is not permanently stored, and/or is not made available to user activity monitor 280 and/o activity pattern inference engine 260.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user-data associated with communication events; etc.) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with associated with a personalization-related application, a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User activity monitor 280 is generally responsible for monitoring user data for information that may be used for determining user activity information, which may include identifying and/or tracking features (sometimes referred to herein as "variables") or other information regarding specific user actions and related contextual information. Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social-media, or similar information sources), and which may include contextual information associated with the identified user activity. User activity monitor 280 may determine current or near-real-time user activity information and may also determine historical user activity information, in some embodiments, which may be determined based on gathering observations of user activity over time, accessing user logs of past activity (such as browsing history, for example). Further, in some embodiments, user activity monitor 280 may determine user activity (which may include historical activity) from other similar users (i.e. crowdsourcing), as described previously.

In some embodiments, information determined by user activity monitor 280 may be provided to activity pattern inference engine 260 including information regarding the current context and historical visits (historical observations). Some embodiments may also provide user activity information, such as current user activity, to one or more activity pattern consumers 270. As described previously, user activity features may be determined by monitoring user data received from user-data collection component 210. In some embodiments, the user data and/or information about the user activity determined from the user data is stored in a user profile, such as user profile 240.

In an embodiment, user activity monitor 280 comprises one or more applications or services that analyze information detected via one or more user devices used by the user and/or cloud-based services associated with the user, to determine activity information and related contextual information. Information about user devices associated with a user may be determined from the user data made available via user-data collection component 210, and maybe provided to user activity monitor 280, activity pattern inference engine 270, or other components of system 200.

More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user activity monitor 280, or its subcomponents, may determine a device name or identification (device ID) for each device associated with a user. This information about the identified user devices associated with a user may be stored in a user profile associated with the user, such as in user accounts and devices 244 of user profile 240. In an embodiment, the user devices may be polled, interrogated, or otherwise analyzed to determine information about the devices. This information may be used for determining a label or identification of the device (e.g. a device id) so that the user interaction with device may be recognized from user data by user activity monitor 280. In some embodiments, users may declare or register a device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

As shown in example system 200, user activity monitor 280 comprises a user activity detector 282, contextual information extractor 284, and an activity features determiner 286. In some embodiments, user activity monitor 280, one or more of its subcomponents, or other components of system 200, such as activity pattern consumers 270 or activity pattern inference engine 260, may determine interpretive data from received user data. Interpretive data corresponds to data utilized by these components of system 200 or subcomponents of user activity monitor 280 to interpret user data. For example, interpretive data can be used to provide other context to user data, which can support determinations or inferences made by the components or subcomponents. Moreover, it is contemplated that embodiments of user activity monitor 280, its subcomponents, and other components of system 200 may use user data and/or user data in combination with interpretive data for carrying out the objectives of the subcomponents described herein.

Additionally, although several examples of how user activity monitor 280 and its subcomponents may identify user activity information are described herein, many variations of user activity identification and user activity monitoring are possible in various embodiments of the disclosure.

User activity detector 282, in general, is responsible for determining (or identifying) a user action or activity event has occurred. Embodiments of activity detector 282 may be used for determining current user activity or one or more historical user actions. Some embodiments of activity detector 282 may monitor user data for activity-related features or variables corresponding to user activity such as indications of applications launched or accessed, files accessed, modified, copied, etc., websites navigated to, online content downloaded and rendered or played, or similar user activities.

Additionally, some embodiments of user activity detector 282 extract from the user data information about user activity, which may include current user activity, historical user activity, and/or related information such as contextual information. (Alternatively or in addition, in some embodiments contextual information extractor 284 determines and extracts contextual information. Similarly, in some embodiments, activity features determiner 286 extract information about user activity, such user activity related features, based on an identification of the activity determined by user activity detector 282.) Examples of extracted user activity information may include app usage, online activity, searches, calls, usage duration, application data (e.g. emails, messages, posts, user status, notifications, etc.), or nearly any other data related to user interactions with the user device or user activity via a user device. Among other components of system 200, the extracted user activity information determined by activity detector 282 may be provided to other subcomponents of user activity monitor 280, activity pattern inference engine 260, or one or more activity pattern consumers 270. Further, the extracted user activity may be stored in a user profile associated with the user, such as in user activity information component 242 of user profile 240. In some embodiments, activity detector 282 or user activity monitor 280 (or its other sub components) performs conflation on the detected user activity information. For example, overlapping information may be merged and duplicated or redundant information eliminated.

In some embodiments, the user activity-related features may be interpreted to determine a user activity has occurred. For example, in some embodiments, activity detector 282 employs user activity event logic, which may include rules, conditions, associations, classification models, or other criteria to identify user activity. For example, in one embodiment, user activity event logic may include comparing user activity criteria with the user data in order to determine that an activity event has occurred. The activity event logic can take many different forms depending on the mechanism used to identify an activity event. For example, the user activity event logic could be training data used to train a neural network that is used to evaluate user data to determine when an activity event has occurred. The activity event logic may comprise fuzzy logic, neural network, finite state machine, support vector machine, logistic regression, clustering, or machine learning techniques, similar statistical classification processes or, combinations of these to identify activity events from user data. For example, activity event logic may specify types of user device interaction(s) information that are associated with an activity event, such as a navigating to a website, composing an email, or launching an app. In some embodiments, a series or sequence of user device interactions may be mapped to an activity event, such that the activity event may be detected upon determining that the user data indicates the series or sequence of user interactions has been carried out by the user.

In some embodiments, activity event logic maybe specify types of user-device related activity that is considered user activity, such as activity that happens while a user is logged into the user device, while user interfaces are receiving input (e.g. while a computer mouse, touchpad, screen, voice-recognition interface, or the like are active), or certain types of activity like launching applications, modifying files with applications, opening a browser and navigating to a website, etc. In this way, the activity event logic may be used to distinguish genuine user activity from automated activity of processes running on the user devices, such as automatic updates or malware scanning. Once a user activity is determined, these features or additional related features may be detected and associated with the detected activity for use in determining activity patterns.

In some embodiments, user activity detector 282 runs on or in association with each user device for a user. Activity detector 282 may include functionality that polls or analyzes aspects of the operating system to determine user activity related features (such as installed or running applications or file accesses and modifications, for example) network communications, and/or other user actions detectable via the user device including sequences of actions.

In some embodiments, such as the embodiment shown in system 200, user activity detector 282 includes subcomponents comprising an app activity logging pipeline 283 and a browse activity logging pipeline 285. These logging pipelines may be embodied as client-side applications or services that run on each user device associated with a user, and in some embodiments may run in conjunction with applications or inside (or as a part of) applications, such as within a browser or as a browser plug-in or extension. App activity logging pipeline 283, in general, manages logging of a user's application (or app) activity, such as application download, launch, access, use (which may include duration), file access via the application, and in-application user activity (which may include application content). Browse activity logging pipeline 285, in general, manages logging of a user's browse activity, such as websites visited, social media activity (which may include browse-type activity conducted via specific browsers or apps like the Facebook® app, Twitter® app, Instagram® app, Pinterest® app, etc.) content downloaded, files accessed, and other browse-related user activity. In some embodiments, each browser on a user device is associated with an instance of browse activity logging pipeline 285, or alternatively a plugin or service that provided browse information to a single instance of browse activity logging pipeline 285 on the user device. In some embodiments, app and browse activity logging pipelines 283 and 285 may also perform functionality described in connection with contextual information extractor 284, such as logging timestamps, location stamps, user-device related information, or other contextual information that is associated with the logged app activity or browse activity. In some embodiments, app and browse activity logging pipelines 283 and 285 upload logged user activity information to activity pattern inference engine 260 and/or store the logged activity information in a user profile associated with the user, such as in user activity information component 242 of user profile 240.

Contextual information extractor 284, in general, is responsible for determining contextual information related to the user activity (detected by user activity detector 282 or user activity monitor 280), such as context features or variables associated with user activity, related information, and user-related activity, and further responsible for associating the determined contextual information with the detected user activity. In some embodiments, contextual information extractor 284 may associate the determined contextual information with the related user activity and may also log the contextual information with the associated user activity. Alternatively, the association or logging may be carried out by another service. For example, some embodiments of contextual information extractor 284 provide the determined contextual information to activity features determiner 286, which determines activity features of the user activity and/or related contextual information.

Some embodiments of contextual information extractor 284 determine contextual information related to a user action or activity event such as entities identified in a user activity or related to the activity (e.g., recipients of a group email sent by the user), which may include nicknames used by the user (e.g., "mom" and "dad" referring to specific entities who may be identified in the user's contacts by their actual names), user activity associated with the location or venue of the user's device. By way of example and not limitation, this may include context features such as location data; which may be represented as a location stamp associated with the activity; contextual information about the location, such as venue information (e.g. this is the user's office location, home location, school, restaurant, move theater, etc.), yellow pages identifier (YPID) information, time, day, and/or date, which may be represented as a timestamp associated with the activity; user device characteristics or user device identification information regarding the device on which the user carried out the activity; duration of the user activity, other user activity/activities preceding and/or following the user activity (such as sequences of websites visited, a sequence of online searches conducted, sequences of application and website usage, such as browsing to a bank and then accessing an Excel® spreadsheet file to record financial information, or the like), other information about the activity such as entities associated with the activity (e.g. venues, people, objects, etc.) which may include nicknames or personal expressions or terms used by (and in some instances created by) the user or acquaintances of the user (for example, a name for the venue that is specific to the user but not everyone, such as "Dikla's home," "Shira's car," "my Seattle friends," etc.), information detected by sensor(s) on user devices associated with the user that is concurrent or substantially concurrent to the user activity (e.g. motion information or physiological information detected on a fitness tracking user device, listening to music, which may detected via a microphone sensor if the source of the music is not a user device), or any other information related to the user activity that is detectable that may be used for determining patterns of user activity.

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 244 of user profile 240. In an embodiment, the user devices may be polled, interrogated, or otherwise analyzed to determine contextual information about the devices. This information may be used for determining a label or identification of the device (e.g. a device id) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some implementations, contextual information extractor 284 may receive user data from user-data collection component 210, parse the data, in some instances, and identify and extract context features or variables (which may also be carried out by activity features determiner 286). Context variables may be stored as a related set of contextual information associated with the user activity, and may be stored in a user profile such as in user activity information component 242. In some cases, contextual information may be used by one or more activity pattern consumers, such as for personalizing content or a user experience, such as when, where, or how to present content. Contextual information also may be determined from the user data of one or more users, in some embodiments, which may be provided by user-data collection component 210 in lieu of or in addition to user activity information for the particular user.

Activity features determiner 286 is generally responsible for determining activity-related features (or variables) associated with the user activity that may be used for identifying patterns of user activity. Activity features may be determined from information about a user activity and/or from related contextual information. In some embodiments, activity features determiner 286 receives user-activity or related information from user activity monitor 280 (or its subcomponents), and analyzes the received information to determine a set of one or more features associated with the user activity.

Examples of activity-related features include, without limitation, location-related features, such as location of the user device(s) during the user activity, venue-related information associated with the location, or other location-related information; time related features, such as time(s) of day(s), day of week or month the user activity, or the duration of the activity, or related duration information such as how long the user used an application associated with the activity; user device-related features, such as device type (e.g. desktop, tablet, mobile phone, fitness tracker, heart rate monitor, etc.) hardware properties or profiles, OS or firmware properties, device IDs or model numbers, network-related information (e.g. mac address, network name, IP address, domain, work group, information about other devices detected on the local network, router information, proxy or VPN information, other network connection information, etc.), position/motion/orientation related information about the user device, power information such as battery level, time of connecting/disconnecting a charger, user-access/touch information; usage related features, such as file(s) accessed, app usage (which may also include application data, in-app usage, concurrently running applications), network usage information, user account(s) accessed or otherwise used, (such as device account(s), OS level account(s), or online/cloud-services related account(s), such as Microsoft® account or Net Passport, online storage account(s), email, calendar, or social networking accounts, etc.; content-related features, such as online activity (e.g. searches, browsed websites, purchases, social networking activity, communications sent or received including social media posts; other features that may be detected concurrent with the user activity or near the time or the user activity; or any other features that may be detected or sensed and used for determining a pattern of the user activity. Features may also include information about user(s) using the device; other information identifying a user, such as a login password, biometric data, which may be provided by a fitness tracker or biometric scanner; and/or characteristics of the user(s) who use the device, which may be useful for distinguishing users on devices that are shared by more than one user. In some embodiments, user activity event logic (described in connection to user activity detector 282) may be utilized to identify specific features from user activity information.

Continuing with system 200 of FIG. 2, activity pattern inference engine 260 is generally responsible for determining user activity patterns based on the user activity information determined from user activity monitor 280. In some embodiments, activity pattern inference engine 260 may run on a server, as a distributed application across multiple devices, or in the cloud. At a high level, activity pattern inference engine 260 may receive user-activity-related information, which may be uploaded from user-activity logs from client-side applications or services associated with user activity monitor 280. One or more inference algorithms may be applied to the user-activity-related information to determine a set of likely user activity patterns. For example, patterns may be determined based on similar instances of observation of user activity or associated contextual information, which may be referred to as "in-common features" of user activity-related information. The inferred activity pattern information may be provided to an activity pattern consumer 270 and/or used to generate a pattern based prediction regarding likely future user action(s). In some embodiments, a corresponding confidence is also determined for the patterns (or predictions based on the patterns), as described herein. Further, the activity pattern (or prediction of future action based on a pattern) may comprise a single (future-occurring) user activity likely to occur, a sequence of future user actions, or probabilities for more than one future action; for example, and eighty percent likelihood that the next action will be browsing to website A and a fifteen percent likelihood that the next action will be launching a music player application, and a five percent likelihood that the next action will be browsing to website B.

As shown in example system 200, activity pattern inference engine 260 comprises semantic information analyzer 262, features similarity identifier 264, and activity pattern determiner 266. Semantic information analyzer 262 is generally responsible for determining semantic information associated with the user-activity related features identified by user activity monitor 280. For example, while a user-activity feature may indicate a specific website visited by the user, semantic analysis may determine the category of website, related websites, themes or topics or other entities associated with the website or user activity. Semantic information analyzer 262 may determine additional user-activity related features semantically related to the user activity, which may be used for identifying user activity patterns.

In particular, as described previously, a semantic analysis is performed on the user activity information, which may include the contextual information, to characterize aspects of the user action or activity event. For example, in some embodiments, activity features associated with an activity event may be classified or categorized (such as by type, timeframe or location, work-related, home-related, themes, related entities, other user(s) (such as communication to or from another user) and/or relation of the other user to the user (e.g. family member, close friend, work acquaintance, boss, or the like), or other categories), or related features may be identified for use in determining a similarity or relational proximity to other user activity events, which may indicate a pattern. In some embodiments, semantic information analyzer 262 may utilize a semantic knowledge representation, such as a relational knowledge graph. Semantic information analyzer 262 may also utilize semantic analysis logic, including rules, conditions, or associations to determine semantic information related to the user activity. For example, a user activity event comprising an email sent to someone who works with the user may be characterized as a work-related activity. Thus where the user emails some person she works with every Sunday night, but not necessarily the same person, a pattern may be determined (using activity pattern determiner 266) that the user performs work-related activities every Sunday night. Accordingly, it may be appropriate to surface a notification, such as a reminder, relating to the user's work to the user on Sunday night since the user has a pattern of working on Sunday night. (Here, a notification service is one example of an activity pattern consumer 270).

Semantic information analyzer 262 may also be used to characterize contextual information associated with the user activity event, such as determining that a location associated with the activity corresponds to a hub or venue of interest to the user (such as the user's home, work, gym, or the like) based on frequency of user visits. For example, the user's home hub may be determined (using semantic analysis logic) to be the location where the user spends most of her time between 8 PM and 6 AM.) Similarly, the semantic analysis may determine time of day that correspond to working hours, lunch time, commute time, etc. Similarly, the semantic analysis may categorize the activity as being associated with work or home, based on other characteristics of the activity (e.g. a batch of online searches about chi-squared distribution that occurs during working hours at a location corresponding to the user's office may be determined to be work-related activity, whereas streaming a movie on Friday night at a location corresponding to the user's home may be determined to be home-related activity). In this way, the semantic analysis provided by semantic information analyzer 262 may provide other relevant features of the user activity events that may be used for determining user activity patterns. For example, where the user activity comprises visiting CNN.com over lunch, and the semantic analysis determines that the user visited a news-related website over lunch, a pattern of user activity may be determined (by activity pattern determiner 266) indicating that the user routinely visits news-related websites over lunch, but only occasionally visits CNN.com as one of those news-related websites.

Features similarity identifier 264 is generally responsible for determining similarity of activity features of two or more user activity events (put another way, activity features characterizing a first user activity event that are similar to activity features characterizing a second user activity event). The activity features may include features relating to contextual information and features determined by semantic analyzer 262. Activity events having in-common activity features may be used to identify an activity pattern, which may be determined using activity pattern determiner 266.

For example, in some embodiments, features similarity identifier 264 may be used in conjunction with one or more pattern based predictors 267 (a subcomponent of activity pattern determiner 266) to determine a set of user activity events that have in-common features. In some embodiments, this set of user activity events may be used as inputs to a pattern based predictor, as described below. In some embodiments, features similarity identifier 264 comprises functionality for determining similarity of periodic- and behavioral-based activity features. Periodic features comprise, for example, features that may occur periodically; for example, features on a day of the week or month, even/odd days (or weeks), monthly, yearly, every other day, every $3^{rd}$ day, etc. Behavior features may comprise behaviors such as user activities that tend to occur with certain locations or activities occurring before or after a given user activity event (or sequence of previous activity events), for example.

In embodiments where activity features have a value, similarity may be determined among different activity features having the same value or approximately the same value, based on the particular feature. (For example, a timestamp of a first activity happening at 9:01 AM on Friday and a timestamp of a second activity happening at 9:07 AM on Friday may be determined to have similar or in-common timestamp features.)

Activity pattern determiner 266 is generally responsible for determining a user activity pattern based on similarities identified in user activity information. In particular, activity pattern determiner 266 (or activity pattern inference engine 260) may determine a user activity pattern based on repetitions of similar activity features associated with a plurality of observed activity events. Thus for example, an activity pattern may be determined where activity features corresponding to two or more activity events are similar. In some instances, an activity event may have many corresponding activity features, which may be represented as a feature vector associated with a particular activity event. Accordingly, the analysis carried out by activity pattern determiner 266 may involve comparing the activity features from features vectors of plurality of activity events.

In some embodiments, activity patterns may be determined using pattern inferences logic 230. Pattern inferences logic may include rules, associations, conditions, prediction and/or classification models, or pattern inference algorithms. The pattern inferences logic 230 can take many different forms depending on the particular activity pattern or the mechanism used to identify an activity pattern, or identify feature similarity among observed activity events to determine the pattern. For example, some embodiments of pattern inferences logic 230 may employ machine learning mechanisms to determine feature similarity, or other statistical measures to determine the activity events belonging to a set of "example user actions" that support the determined activity pattern, as further described below. The user activity information may be received from user activity monitor 280 and information about identified similar features may be received from features similarity identifier 264. In some embodiments, the user pattern(s) determined by activity pattern determiner 266 may be stored as inferred user routines 248 in user profile 240.

In some embodiments, activity pattern determiner 266 provides a pattern of user activity and an associated confidence score regarding the strength of the user pattern, which may reflect the likelihood that future user activity will follow the pattern. More specifically, in some embodiments, a corresponding confidence weight or confidence score may be determined regarding a determined user activity pattern. The confidence score may be based on the strength of the pattern, which may be determined based on the number of observations (of a particular user activity event) used to determine a pattern, how frequently the user's actions are consistent with the activity pattern, the age or freshness of the activity observations, the number of similar features, types of features, and/or degree of similarity of the features in common with the activity observations that make up the pattern, or similar measurements.

In some instances, the confidence score may be considered when providing a determined activity pattern to an activity pattern consumer 270. For example, in some embodiments, a minimum confidence score may be needed before using the activity pattern to provide an improved user experience or other service by an activity pattern consumer 270. In one embodiment, a threshold of 0.6 (or just over fifty percent) is utilized such that only activity patterns having a 0.6 (or greater) likelihood of predicting user activity may be may be provided. Nevertheless, where confidence scores and thresholds are used, determined patterns of user activity with confidence scores less than the threshold still may be monitored and updated based on additional activity observations, since the additional observations of may increase the confidence for a particular pattern.

Some embodiments of activity pattern determiner 266 determine a pattern according to the example approaches described below, where each instance of a user activity event has corresponding historical values of tracked activity features (variables) that form patterns, and where activity pattern determiner 266 may evaluate the distribution of the tracked variables for patterns. In the following example, a tracked variable for a user activity event is a timestamp corresponding to an observed instance of the user activity event. However, it will be appreciated that, conceptually, the following can be applied to different types of historical values for tracked activity features (variables).

A bag of timestamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the user-device interaction, such as:

$$h_{ij} = \sum_{m=1}^{M} I[\text{dayOfWeek}[t_m]=i] \cdot I[\text{hourOfDay}[t_m]=j].$$

This histogram can be used to determine derivative histograms. For example, a day of the week histogram may correspond to: $h_j = \Sigma_i h_{ij}$. An hour of the day histogram may correspond to: $h_i = \Sigma_j h_{ij}$. As further examples, one or more histograms may be determined for particular semantic time resolutions in the form of: $h_{iC} = \Sigma_{j \in C} h_{ij}$. Any of various semantic time resolutions may be employed, such as weekdays and weekends, or morning, afternoon, and night. An example of the latter is where $C \in \{\text{morning, afternoon, night}\}$, morning=$\{9, 10, 11\}$, afternoon=$\{12, 13, 14, 15, 16\}$, and night=$\{21, 22, 23, 24\}$.

An additional data structure utilized in representing an event can comprise the number of distinct time stamps in every calendar week that has at least one timestamp therein, which may be represented as:

$$w_i^j = \|\{m | t_m \text{ is within the } i\text{-th } j\text{week period}\}\|.$$

As an example, $w_2^3$ can denote the number of distinct timestamps during the $2^{nd}$ three-week period of available timestamps. $N^{(j)}$ may be utilized to denote the number of j-week time stamps available in the tracked data; for example, $N^{(3)}$ denotes the number of three-week periods available in the timestamps.

Activity pattern determiner 266 (or activity pattern inference engine 260) may generate a confidence score that quantifies a level of certainty that a particular pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For timestamps, examples include Tuesday at 9 am, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_i^K (\alpha_0 + h_i)};$$

where K denotes the number of bins, $\alpha_0$ is a parameter encoding the strength of prior knowledge, and $i^* = \arg\max_i x_i$. Then, the pattern prediction is the bin of the histogram corresponding to $i^*$ and its confidence is given by $x_i^*$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of timestamps. Examples include 1 visit per week, and 3 visits every 2 weeks. Using a Gaussian posterior, a confidence score may be generated for a pattern for every period resolution, denoted as j. This may be accomplished by employing the formula:

$$\widehat{\mu^{(j)}} = \lambda \left( \frac{1}{N^{(j)}} \sum_i^{N^{(j)}} w_i^{(j)} \right) + (1-\lambda)\mu_0, \text{ where } \lambda = \frac{\sigma_0^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$conf_j = P(|x - \widehat{\mu^{(j)}}| < a) = \int_{\widehat{\mu^{(j)}}-a}^{\widehat{\mu^{(j)}}+a} \mathcal{N}(x | \widehat{\mu^{(j)}}, \widehat{\sigma}^{(j)}),$$

$$\text{where } \widehat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., satisfies a threshold value), activity pattern determiner 266 may identify that a plurality of user activities corresponds to a user activity pattern for the user. As a further example, activity pattern determiner 266 may determine that a user activity pattern is likely to be followed by a user where one or more of the confidence scores for one or more tracked variables satisfy a threshold value.

In some embodiments, patterns of user activity may be determined by monitoring one or more activity features, as described previously. These monitored activity features may be determined from the user data described previously as tracked variables or as described in connection to user-data collection component 210. In some cases, the variables can represent context similarities and/or semantic similarities among multiple user actions (activity events). In this way, patterns may be identified by detecting variables or features in common over multiple user actions. More specifically, features associated with a first user action may be correlated with features of a second user action to determine a likely pattern. An identified feature pattern may become stronger (i.e., more likely or more predictable) the more often the user activity observations that make up the pattern are repeated. Similarly, specific features can become more strongly associated with a user activity pattern as they are repeated.

In some embodiments, such as the example embodiment shown in system 200, activity pattern determiner 266 includes one or more pattern based predictors 267. Pattern based predictors 267 comprises one or more predictors for predicting a next or future user action taken by the user based on patterns, such as patterns of behavior or similarity features. At a high level, a pattern-based predictor 267 receives user activity information and/or activity features associated with a user activity and determines a prediction of the next action or a future action taken by the user. In an embodiment, a pattern-based predictor 267 includes functionality, as further described below, for performing user activity filtering, determining an activity score, selecting an activity based on the score, and determining a particular pattern-based prediction.

In one embodiment, a pattern-based predictor 267 uses features similarity identifier 264 to determine features or patterns in common between historical user activities and a recent user activity. For example, similarity of periodic features may be determined, from among the set of historical user actions, from those historical actions having a periodic feature in common with a current or recent user action. Thus for example, if a recent user action happened on a Monday, on the first day of the month, on an even week, or on a week day, then determining periodic features similarity would comprise identifying those historical user actions that have features indicating the user action happened on a Monday, those historical user actions having features corresponding to first day of the month (any first day, not just Mondays), or happening on an even week, or a week day. Likewise, behavior features similarity may be determined to identify sets of historical user actions having a particular behavior feature in common with a current or recent user action. For example, if a recent user action includes visiting a news-related website, then determining behavior features similarity would comprise identifying those historical user actions that have features indicating the user visited a news-related website.

User activity filtering may use the feature similarity determinations to filter out historical user actions and retain only those historical user actions that have a particular feature (or features) in common with a current or recent user action. Thus, in some embodiments, each pattern-based predictor 267 may be designed (or tuned) for determining a prediction based on a particular feature (or features); for example there might be a subset of pattern-based predictors 267 used for determining a prediction when the feature indicates a work day, or weekend, or Monday, or particular app access, or application usage duration, etc. Such a pattern-based predictor 267 may need only those historical user actions corresponding to its prediction model. (In some embodiments, such pattern-based predictors may utilize specific prediction algorithms or models, based on their type of pattern prediction (prediction model). These algorithms or models may be stored in with pattern inferences logic 230 in storage 225.)

Accordingly, in some embodiments, for each pattern-based predictor 267, user activity filtering may be carried out to determine a set of historical user actions that are relevant to that particular pattern-based predictor 267; which may include, for example, periodic-feature based predictors, behavior-feature based predictors (which may include behavior sequences or sequences of previous user actions), unique or uncommon behavior features (such as when a user performs an activity at an unusual time when compared to similar historical user activities) or other types of feature-based predictors. (In some embodiments, features similarity identifier 264 may determine user activity sequence similarity (e.g. the sequence of the last K user actions prior to the current action (or a particular recent action) by determining a Levenschtein distance between the historical user action sequence and recent user action sequences.

Additionally, in embodiments where user activity filtering may be performed such that each predictor 267 determines a subset of historical user actions with features that correspond to its prediction criteria, for each predictor 267, for the subset of historical user actions that pass the filter, user action scoring may be performed on the subset of features. User action scoring generally compares similarities of features in the current or recent user action and the subset of historical user actions (which may be considered as a comparison of contexts) and scores each user action with respect to the similarity of its features. In particular, some embodiments score not only those features used for determining the subset of historical user actions, but all (or a larger number) of features available in the current or recent action and historical actions for comparison. In some embodiments, a Boolean logic process is used (i.e. the features have to be true or have the same pattern, and if this is satisfied, then the difference between the particular features is determined). The differences may include, for example, differences in the time-relate features, usage duration, sequence distances, etc. In an embodiment, these differences are determined and put into a sigmoid. Further, in an embodiment, a similarity threshold is used, which may be pre-determined, tunable, or adaptive, or may be initially set to a value based on a population of users or may be based on empirical information learned about the particular user, for example, and may be adaptive based on the number of historical observations. The similarity threshold may be used to determine whether a particular historical user action is "similar enough" to the particular current or recent user action so as to be considered for determining a prediction. In some embodiments, a vector representing the similarity differences (or similarity score) may be determined; for example, where multiple features are evaluated for similarity.

The user actions from the subset of historical user actions that are most similar (or similar enough) to the particular current or recent user action may be selected. In some embodiments, the selection process uses a similarity threshold, such as described above, to determine those historical user actions that satisfy the similarity threshold. (Although the term "selection" is used, it is contemplated that the selection is performed by a computer-related process that does not require a person to perform the selection.) The selected historical user actions comprise a set of "example user actions."

A prediction of the user's next action (or future action) may be inferred based on (or according to) the historical user actions in the set of example user actions. In an embodiment, the predicted next user action (or future action) is the next user action with the highest observations count (i.e. the next user action that is predicted the most based on the set of example user actions). Those historical user actions in the et of example user actions that are consistent with the prediction comprise a "prediction support set." In some embodiments, a prediction probability corresponding to the prediction may be determined; for example, based on a ratio of the size of the prediction support set vs. the total number of observations (historical user actions in the subset determined by the user action filtering). Moreover, in some embodiments, the prediction may also comprise additional information related to the predicted user action(s), such as activity features which characterize the predicted action(s). By way of example and not limitation, if the predicted action is that the user will email a work colleague, additional activity features may indicate the specific email recipient, the subject matter of the email, the approximate time the user will access his email program to compose the email, or other information related to the predicted action. The related information may also be determined based on the activity features of the prediction support set observations.

Some embodiments also determine a prediction significance, which may be determined based on a confidence interval (e.g. a Binomial confidence interval) or other appropriate statistical measure. Still further, in some embodiments, the prediction confidence may be based on the prediction probability and the prediction significance (e.g. the product of the prediction probability and prediction significance). Accordingly, some embodiments of activity pattern determiner 266 provide a predicted next (or future) user action or series of next (or future) actions for each of the pattern based predictors 267.

Some embodiments determine a specific prediction from the one or more pattern-based predictors 267. In an embodiment, an ensemble process is utilized wherein the one or more pattern-based predictors 267 vote, and a selection is determined based on the ensemble-member predictors. Further, in some embodiments, ensemble-member predictors may be weighted based on learned information about the user actions. In one embodiment, once each pattern based predictor 267 has provided a prediction, the prediction that has the highest corresponding confidence is determined as the next (or future) predicted user action, and may be considered a pattern-based (or history-based) prediction. In some embodiments, the output of activity pattern determiner 266 may be stored as inferred user routines 248 in user profile 240, and in some embodiments may be provided to an activity pattern consumer 270.

Continuing with FIG. 2, example system 200 includes one or more activity pattern consumers 270, which comprise applications or services that consume activity pattern information to provide improved user experiences. Examples of activity pattern consumers 270 may include, without limitation, content personalization services, user intent inference services, automatic speech recognition services, device power management services, and semantic understanding services.

In particular, a first example activity pattern consumer 270 comprises content personalization services. In one embodiment, a content personalization engine 271 is provided to facilitate providing a personalized user experience. Thus content personalization engine 271 may be considered one example of an application or service (or set of applications or services) that may consume information about user activity patterns, which may include the predictions of future user actions as determined by implementations of the present disclosure.

At a high level, example content personalization engine 271 is responsible for generating and providing aspects of personalized user experiences, such as personalized content or tailored delivery of content to a user. The content may be provided to the user as a personalized notification (such as described in connection with presentation component 220), may be provided to an application or service of the user (such as a calendar or scheduling application), or may be provided as part of an API where it may be consumed by yet another application or service. In one embodiment, the personalized content includes suggesting that the user perform a relevant activity at the right time before the user performs the activity manually. For example, where an activity pattern indicates the user visits his bank's website near the beginning of the month and enters financial information into an Excel file, the user may be provided with a recommendation asking the user, "Would you like to visit your bank website?" Upon responding affirmatively, a browser instance may be provided that has automatically navigated to the user's bank's website. Further, the particular Excel file may be opened automatically when the user acknowledges the suggestion or when the user navigates to the bank's website. Still further, the user may be provided this content (here, the notification suggestion) at a convenient time, such as when the user is at his home, on an evening, near the beginning of the month.

In one embodiment, the personalized content may include a notification which comprises a reminder, a recommendation, suggestion, request, communication-related data (e.g. an email, instant message, or call notification), information relevant to the user in some manner, or other content that is provided to the user in a way that is personalized. For example, content may be provided at a time when the user would most likely desire to receive it, such as a work-related notification provided at a time according to a user pattern indicating that the user is about to begin a work-related activity, and not providing the content at a time when it is likely to be dismissed, ignored, or bothersome.

In another example of providing personalized content, where an activity pattern indicates that a user typically checks online for coupons when shopping at a particular store, then upon user data indicating that a user has entered the store or is likely going to the store (which may be determined based on a predicted future activity), the user may be automatically provided with the online coupons. Further, the particular coupons provided may be for items that the user typically buys (or for similar items from competitors) based on user activity pattern information, which may include the user's purchasing habits.

In some embodiments, content personalization engine 271 tailors content for a user to provide a personalized user experience. For example, content personalization engine 271 may generate a personalized notification to be presented to a user, which may be provided to presentation component 220. Alternatively, in other embodiments, content personalization engine 271 generates notification content and makes it available to presentation component 220, which determines when and how (i.e., what format) to present the notification based on user data, user activity pattern information. For example, if a user activity pattern indicates the user is likely to be driving to work at a time when it is relevant to present a particular notification, it may be appropriate to provide that notification in an audio format, thus personalizing it to the context of the user.) In some embodiments, other services or applications operating in conjunction with presentation component 220 determine or facilitate determining when and how to present personalized content. The personalized content may be stored in a user profile 240, such as in a personalized content component 249.

Some embodiments of content personalization engine 271 evaluate user content to determine how to provide the content in an appropriate manner. For example, content that is determined to be work related may be withheld from presentation to a user until user activity pattern indicates the user is likely to be conducting work-related activity.

A second example activity pattern consumer 270 comprises a user intent inference service. A user's intent may be inferred based on user activity pattern information. In particular, whenever a user interacts with a computing device, such as when the user engages in a user activity, it may be assumed that the user has intent. In one embodiment, a user activity pattern may be analyzed along with sensor data collected by a user device regarding a particular user interaction, such as a user request or commend. The user' intent may be inferred based on determining a likely intent that is consistent with a user activity pattern. For example, during a user's lunch hour, the user may perform an online search with the intent of locating information about the user's favorite band, R.E.M., and not information about rapid eye movement (REM) sleep. A user activity pattern indicating that the user typically browses music-entertainment related websites over his lunch hour and/or other activity pattern information about the user indicating that the user recently listened to music by REM may be used to resolve the user's intent for the query, namely search results related to the music group REM and not results related to rapid eye movement. As another example, suppose while driving home the user issues a spoken request to a user device to "call Pat." However, the user has more than one "Pat" on his contact list; for example, the user's brother is named Pat and several of the user's friends are also named Pat. Based on an inferred pattern of user activity indicating that the user typically calls his family while driving home, it may be determined that the user's intent is to call his brother Pat because this intent is consistent with an activity pattern.

A third example activity pattern consumer 270 comprises automatic speech recognition (ASR) services. In one embodiment of the disclosure, an ASR service with improved speech recognition and understanding is provided. The improved ASR service may use information from inferred user activity patterns to more accurately resolve, disambiguate, or understand user speech. In particular, a user's speech may be resolved to be consistent with user activity pattern information. For example, suppose that for a particular user, a user activity pattern indicates that over lunch the user typically browses news-related websites. Suppose near 12:00 pm on a given day that the user speaks a request to a personal assistant service, such as Cortana®, to go to CNN.com, (e.g., "go to see en en dot corn"). But the use's request also sounds phonetically similar to go to CMM.com or go to CMN.com. Moreover, the user's spoken request may be even more difficult to recognize if there is background noise present. However, the information from an inferred user activity pattern indicating that the user typically browses news-related websites may be used to more accurately resolve and understand the user speech. Here, the improved ASR service may determine that the user likely said "CNN.com" and not CMN.com or CMM.com because CMN.com and CMM.com are not news-related websites; CNN.com is a news-related website; and navigating to CNN.com near 12:00 PM is consistent with the user activity pattern of browsing news-related websites over lunch.

A fourth example activity pattern consumer 270 comprises device power management services. For example, in one embodiment of the disclosure, a device power management service is provided that regulates power consumption of a user device based on user activity pattern information. In particular, based on a pattern of when a user typically charges his mobile device, where it is determined that the time until the typical charging time is great enough such that, based on the mean consumption of battery energy, it is projected that the device will run out of battery power before the time that user typically charges the device, then the power management service may implement power-saving measures to reduce battery consumption. For example, the power management service may automatically switch the device to a battery-saving mode. Similarly, if it is determined that the user is located at or will be located at a location where the user has previously charged his user device, which may be determined based on location-contextual information associated with the user activity related to charging the user device, then the user may be provided a notification recommending that the user charge his user device.

A fifth example activity pattern consumer 270 comprises communications management services. In particular, network bandwidth and other communication-related resources may be more efficiently utilized according to information derived from user activity patterns. For example, suppose a user has a pattern of watching a streaming or downloaded a high-definition movie (e.g. a 4 k movie) on Friday nights. One embodiment of a communications management service may cache or buffer the movie in advance of watching it, so that it is available to watch without interruption. (This may be particularly useful for a user who shares network bandwidth with other users who are watching streaming movies at the same time thereby reducing available network bandwidth.) In some embodiments, the particular movie (or several movies likely to be watched by the user), may be determined from a user's watch list, or may be inferred based on information derived from monitored user activity, such as user tastes, internet searches, movies watched by the user's social media friends, etc. As described previously, some embodiments may use contextual information, such as a user's calendar information, to determine the likelihood that the use will follow the pattern. Thus where a user's calendar indicates that an event is scheduled for next Friday night, then it may be determined that, because the user is not likely to watch a movie, the movie does not need to be downloaded prior to next Friday night. Further, in some embodiments, where a user has a data cap or where network speed is capped or otherwise limited, the movie may be downloaded at an earlier time so that it is already available to watch on Friday night. Still further, in some embodiments, the user may be prompted in advance of downloading a particular movie about whether the user may be interested in watching the movie.

Other examples of activity pattern consumers 270 may include, without limitation: (a) a recommendation service that suggests new content to a user based on user patterns and contextual information. For example, a user activity pattern indicates that a user listens to music every Friday night. Contextual information indicates that the user prefers certain bands or styles of music. Accordingly, on a given Friday night, a recommendation is provided to the user to listen to a new artist having a style similar to the user's taste. (b) A user has an activity pattern of going to music concerts to see bands that sing songs that the user frequently enjoys. A personal assistant application service monitors local concerts and determines that a band that sings songs the user listens to is coming to town. The personal assistant application automatically purchases a ticket for the user when the tickets first become available. Alternatively, the personal assistant service checks the user's calendar to determine that the user is available on the date of the concert, and then prompts the user, notifying the user about the concert, and in some embodiments, asking if the user wants to personal assistant service to purchase a ticket. (d) A user has an activity pattern of watching an online movie on Friday nights. A personal assistant service determines that a user reads certain genres of books, based on information about book purchases and/or e-reader activity by the user. Based on the user's taste in books, a movie may be recommended to the user that the user likely will enjoy. The recommended movie may be automatically downloaded in a manner to preserve bandwidth in advance of Friday night.

Example system 200 also includes a presentation component 220 that is generally responsible for presenting content and related information to a user, such as the personalized content from content personalization engine 271 or content from other activity pattern consumers 270. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user and/or other user data, presentation component 220 may determine on which user device(s) content is presented, as well as the context of the presentation, such as how (or in what format and how much content, which can be dependent on the user device or context) it is presented, when it is presented, etc. In particular, in some embodiments, presentation component 220 applies content logic to device features, associated logical hubs, inferred logical locations, or sensed user data to determine aspects of content presentation.

In some embodiments, presentation component 220 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some embodiments, a personal assistant service or application operating in conjunction with presentation component 220 determines when and how (e.g. presenting when the user is determined to be at a specific logical location) to present the content. In such embodiments, the content, including content logic, may be understood as a recommendation to the presentation component 220 (and/or personal assistant service or application) for when and how to present the notification, which may be overridden by the personal assistant app or presentation component 220.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes activity pattern inferences logic 230, as described previously, and user profiles 240. One example embodiment of a user profile 240 is illustratively provided in FIG. 2. Example user profile 240 includes information associated with a particular user such as user activity information 242, information about user accounts and devices 244, user preferences 246, inferred user routines 248, and personalized content 249. The information stored in user profile 240 may be available to the activity pattern inference engine 260 other components of example system 200.

As described previously, user activity information 242 generally includes user information about user actions or activity events, related contextual information, activity features, or other information determined via user activity monitor 280, and may include historical or current user activity information. User accounts and devices 244 generally includes information about user devices accessed, used, or otherwise associated with a the user, and/or information related to user accounts associated with the user; for example, online or cloud-based accounts (e.g. email, social media) such as a Microsoft® Net passport, other accounts such as entertainment or gaming-related accounts (e.g. Xbox live, Netflix, online game subscription accounts, etc.) user data relating to such accounts such as user emails, texts, instant messages, calls, other communications, and other content; social network accounts and data, such as news feeds; online activity; and calendars, appointments, application data, other user accounts, or the like. Some embodiments of user accounts and devices 244 may store information across one or more databases, knowledge graphs, or data structures. As described previously, the information stored in user accounts and devices 244 may be determined from user-data collection component 210 or user activity monitor 280 (including one its subcomponents).

User preferences 246 generally include user settings or preferences associated with user activity monitoring. By way of example and not limitation, such settings may include user preferences about specific activities (and related information) that the user desires be explicitly monitored or not monitored or categories of activities to be monitored or not monitored, crowdsourcing preferences, such as whether to use crowd sourced information, or whether the user's activity pattern information may be shared as crowdsourcing data; preferences about which activity pattern consumers may consumer the user's activity pattern information; thresholds, and/or notification preferences, as described herein. As described previously, inferred user routines 248 may include one or more user pattern(s) determined by activity pattern determiner 266, and may also include confidence scores associated with the patterns and/or information related to the activity patterns, such as contextual information or semantic information. Personalized content 249 includes personalized content determined from content personalization engine 271, such as pending or scheduled notifications.

With reference now to FIG. 3, aspects of an example system for determining user activity patterns is provided and referenced generally as system 300. Example system 300 may determine user activity patterns based on browse activity and application activity from across multiple devices. As shown, example system 300 comprises one or more client devices 302, an inferences system 350, and one or more activity pattern consumers 370. In various embodiments, a client devices 302 may be embodied as a user device such as user device 102a described in FIG. 1. Client device 302 includes an app activity logging pipeline 383 and a browse activity logging pipeline 385. These logging pipelines may be embodied as client-side applications or services that run on each user device associated with a user, and in some embodiments may run in conjunction with applications or inside (or as a part of) applications, such as within a browser or as a browser plug-in or extension. App activity logging pipeline 383, in general, manages logging of a user's application (or app) activity, such as application download, launch, access, use (which may include duration), file access via the application, and in-application user activity (which may include application content). Browse activity logging pipeline 385, in general, manages logging of a user's browse activity, such as websites visited, social media activity (which may include browse-type activity conducted via specific browsers or apps like the Facebook® app, Twitter® app, Instagram® app, Pinterest® app, etc.) content downloaded, files accessed, and other browse-related user activity. In some embodiments, app activity logging pipeline 383 and a browse activity logging pipeline 385 further include functionality of the embodiments described in connection with app activity logging pipeline 283 and a browse activity logging pipeline 285 of system 200 in FIG. 2.

As shown in system 200, inferences system 350 comprises activity patterns inference engine 360, which receives app activity and browse activity from one or more client devices 302 and uses that information to infer activity patterns. Activity patterns inference engine 360 may be embodied as an embodiment of activity patterns inference engine 260, described in connection to FIG. 2. Further, some embodiments of inferences system 350 may also include other inference engines (not shown). For example, other inference engines might include components for determining venue visiting inferences (i.e., inferring future venue visits or patterns of venue visits); location inferences (i.e., inferring location for the user when explicit location information is not available); or shadow calendar, which may include inferences about a user's availability based on explicit and inferred scheduled events.

Inferences system 350 may provide inferred user activity pattern information (including predicted future actions) to activity pattern consumers 370. In some instances, an activity pattern consumers 370 may be embodied as an activity pattern consumer 270, described in connection to FIG. 2. A further example activity pattern consumers 370 of system 300 includes browser A 372 (or a service associated with browser A) that navigates to a website according to a predicted user activity pattern; for example, automatically navigating to the user's bank website near the beginning of the month, where the user has a pattern of visiting the website at the beginning of the month. Yet another example activity pattern consumers includes app B 373, which may launch and/or load a file, or perform some functionality (e.g. play a song, compose an email, etc.) according to a predicted user activity pattern.

Figure 4:
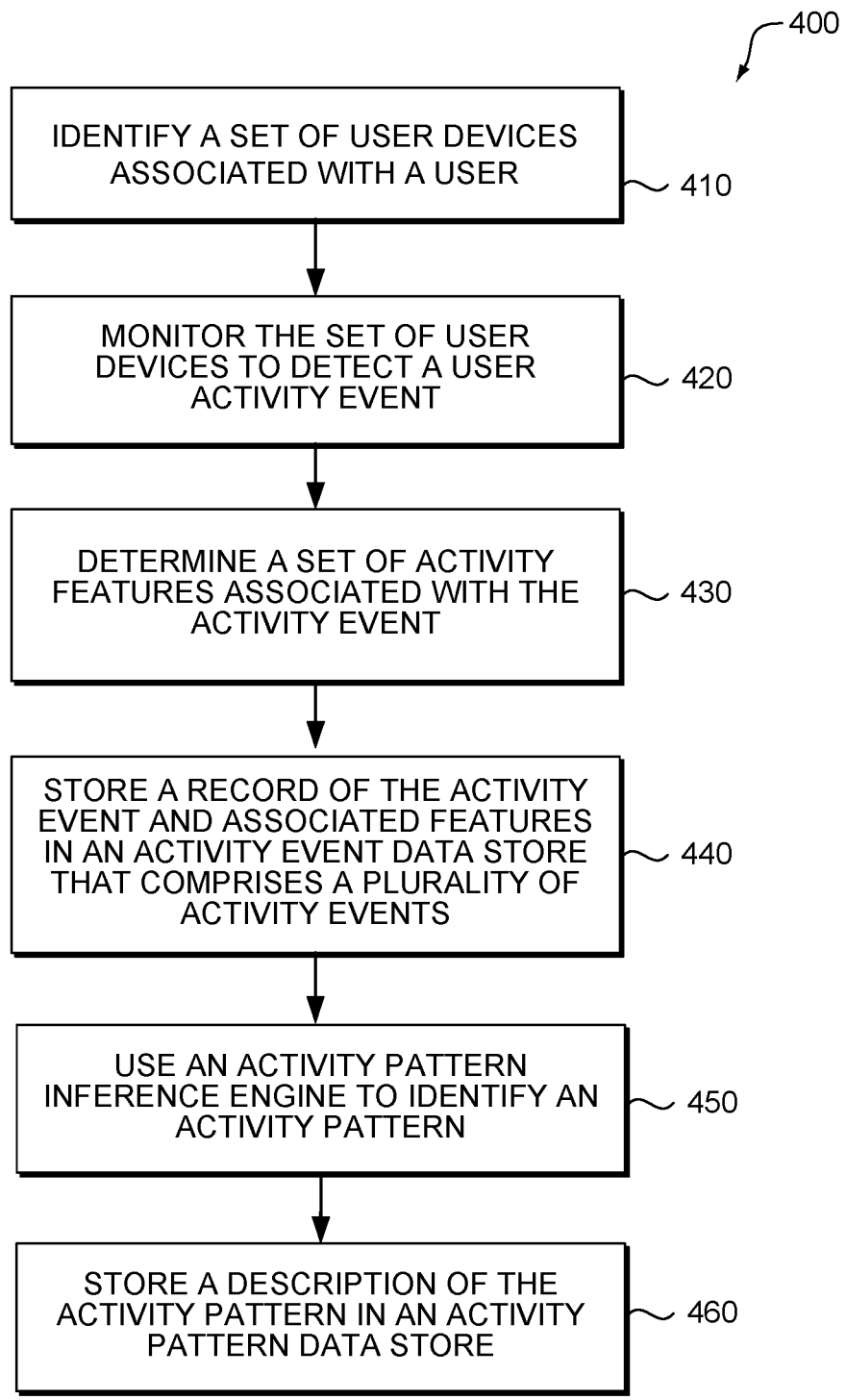
FIG. 4 depicts a flow diagram of a method for inferring a user activity pattern, in accordance with an embodiment of the present disclosure.

Turning to FIG. 4, a flow diagram is provided illustrating one example method 400 for inferring a user activity pattern. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 400 may be performed by one or more computing devices, such as a smart phone or other user device, a server, or by a distributed computing platform, such as in the cloud. The activity pattern may be inferred through the analysis of signal data (or user data) gathered from one or more user devices associated with the user.

At step 410, identify a set of user devices associated with a user. Embodiments of step 410 may determine a set of user devices based on based on monitoring user data for user-device related information. In some embodiments, the set of user devices identified in step 410 comprises one user device or a plurality of user devices, such as user devices 102a through 102n, described in connection to FIG. 1.

In one embodiment, information about user devices associated with a user may be determined from the user data made available via user-data collection component 210, such as described in connection to user activity monitor 280 of FIG. 2. For example, as described previously, information about a user device may be sensed or otherwise detected from user data, such as my one or more sensors associated with a user device, or may be determined by detecting and analyzing user-device related information in user data to determine characteristics of the user device, such as device hardware, software such as operating system (OS), network-related characteristics, user accounts accessed via the device, and similar characteristics. In one embodiment, the detected user devices (such as user device 102a through 102n) may be polled, interrogated, or otherwise analyzed to determine information about the devices. In some implementations, this information may be used for determining a label or identification of the device (e.g. a device ID) so that the user interaction with one device may be recognized from user interaction on another device. In some embodiments of step 410, a user device may be identified based on user provided information, such as the case where a user declares or registers the device; for example, by logging into an account via the user device, installing an application on the device, connecting to an online service that interrogates the device, or otherwise providing information about the device to an application or service.

At step 420, monitor the set of user devices to detect a user activity event. Embodiments of step 420 monitor user data associated with the set of user devices identified in step 410, to identify or detect a user activity event (sometimes referred to herein as a user action). In some instances, an activity event may comprise a series or sequence of user interactions with one or more user devices.

Some embodiments of step 420 may comprise monitoring sensor data, using a one or more sensors associated with the set of user devices. Some embodiments of step 420 may use activity event logic to detect the user activity event, as described in connection to user activity detector 282. Further, some implementations of step 420 may be carried out using a user activity detector component, such as described in system 200 of FIG. 2. Additional details of embodiments of step 420 are provided in connection with user activity detector 282 in FIG. 2.

At step 430, determine a set of activity features associated with the activity event. Upon detecting or otherwise identifying a user activity event in step 420, embodiments of step 430 determine a set of activity features associated with the detected activity event. Some embodiments of step 430 determine the set of activity features based at least in part on sensor data (including data that may be derived from sensor data such as interpretive data) provided by one or more sensors associated with the set of user devices. In some embodiments, the sensor data may be provided via a user data collection component as described in FIG. 2. In particular, user data related to the detected activity event and which may be determined at least in part from sensor data, and may include interpreted data, contextual data and/or semantic information related to the detected activity event, is received and analyzed to determine a set of one or more features associated with the user activity.

As described previously in connection with user activity monitor 280 and activity features determiner 286 of FIG. 2, activity-related features (or variables) associated with the user activity that may be used for identifying patterns of user activity. The activity features may be determined from information about a user activity, which in some embodiments may include related contextual information about the detected activity. Additional details of determining contextual information related to a detected activity event are described below and in connection to contextual information extractor 284 of FIG. 2. Further, in some embodiments, the contextual information may include semantic information determined from a semantic analysis performed on the detected activity event and/or one or more activity features associated with the activity event. For example, while a user-activity feature may indicate a specific website visited by the user, semantic analysis may determine the category of website, related websites, themes or topics or other entities associated with the website or user activity. From the semantic analysis, additional user-activity related features semantically related to the user activity may be determined and used for identifying user activity patterns. Additional details of determining activity features that include semantic information related to the detected activity event are described in connection to semantic information analyzer 262 of FIG. 2.

Examples of activity-related features may include, without limitation, location-related features, such as location of the user device(s) during the user activity, prior to and/or after the user activity, venue-related information associated with the location, or other location-related information; time related features, such as time(s) of day(s), day of week or month the user activity, or the duration of the activity, or related duration information such as how long the user used an application associated with the activity; content-related features, such as online activity by the user (e.g. searches, browsed websites, type or category of websites, purchases, social networking activity, communications sent or received including social media posts, which may comprise online activity occurring prior to or after the detected activity event); other features that may be detected concurrent with the user activity or near the time of the user activity; or any other features that may be detected or sensed and used for determining a pattern of the user activity including semantic features that may characterize aspects of the activity, the nature or type of the activity, and/or user interactions making up the activity. Features may also include information about user(s) using the device; and other contextual features such as user device-related features, usage related features; or other information about the user. By way of example and not limitation, user device-related features may include information about device type (e.g. desktop, tablet, mobile phone, fitness tracker, heart rate monitor, etc.) hardware properties or profiles, OS or firmware properties, device IDs or model numbers, network-related information (e.g. mac address, network name, IP address, domain, work group, information about other devices detected on the local network, router information, proxy or VPN information, other network connection information, etc.), position/motion/orientation related information about the user device, power information such as battery level, time of connecting/disconnecting a charger, user-access/touch information; usage related features may include information about file(s) accessed, app usage (which may also include application data, in-app usage, concurrently running applications), network usage information, user account(s) accessed or otherwise used, (such as device account(s), OS level account(s), or online/cloud-services related account(s) activity, such as Microsoft® account or Net Passport, online storage account (s), email, calendar, or social networking accounts, etc.; other information identifying a user may include login password, biometric data, which may be provided by a fitness tracker or biometric scanner; and/or characteristics of the user(s) who use the device, which may be useful for distinguishing users on devices that are shared by more than one user.

In some embodiments of step 430, user activity event logic (described in connection to user activity detector 282) may be utilized to identify specific features associated with the detected user activity event. Some implementations of step 430 may be carried out using an activity features determiner component, such as described in system 200 of FIG. 2. Additional details of embodiments of step 430 are provided in connection with activity features determiner component 286, in FIG. 2.

At step 440, a record of the detected activity event and the activity features associated with the event are stored in an activity event data store. The activity event data store may comprise a plurality of records about activity events, wherein each record may include information about a particular activity event including one or more activity features associated with the activity event. In some embodiments, the plurality of records in the activity event data store comprise records of other activity events determined according to steps 410 through 430 of method 400. In some instances, some of the other records may include information about activity events (including associated activity features) derived from other users determined to be similar to the particular user, as described previously. In an embodiment, the activity event data store comprises a user profile, and may be stored in a user activity information component, such as user activity information component 242 of user profile 240 described in connection to FIG. 2.

At step 450, an activity pattern inference engine is used to identify an activity pattern. In embodiments of step 450, the activity pattern maybe detected based on an analysis of at least a portion of the plurality of activity event records to identify a set of activity events having similar activity features. Thus embodiments of step 450 may comprise determining a set of user activity events that have in-common features, which may be determined using a features similarity identifier component, such as features similarity identifier 264, described in system 200 of FIG. 2.

In embodiments, the set of activity events having similar activity features may comprise two or more activity events that form the basis of the pattern, as described previously in connection with activity pattern determiner 266. In some embodiments, the similar activity features may be in common with two or more of the activity events, may be substantially similar, or may be similar enough according to a similarity threshold, as described previously. Further, some embodiments may determine a corresponding confidence score associated with the activity pattern. In some instances, the confidence score may indicate a likelihood that the user will behave according to the pattern, and may be used for determining whether to provide activity pattern information to an activity pattern consumer service, such as described in connection to FIG. 2. In some embodiments, one or more pattern based predictors may be utilized, such as described in in connection to FIG. 2.

Step 450 may be carried out by an activity pattern inference engine, such as activity pattern inference engine 260 described in connection to system 200 of FIG. 2, or one of its subcomponents. Additional details of embodiments of step 450 are provided in connection with activity pattern inference engine 260, in FIG. 2.

At step 460, the activity pattern is stored in an activity pattern data store. In an embodiment, the activity pattern data store comprises a user profile, and may be stored in a inferred user routines component, such as inferred user routines 248 of user profile 240 described in connection to FIG. 2. The activity pattern may be accessed by one or more computing applications that provide enhanced or improved computing experiences for the user, such as providing personalization services (e.g. personalized content or tailoring the delivery of content to the user, as described herein), improved speech recognition, more efficient consumption or bandwidth or power, or improved semantic understanding of the user, which may be used for performing disambiguation or other aspects of understanding input from the user.

In some embodiments, once an activity pattern is determined, it can be used to determine that a probable future activity event will occur at a future time that is a threshold time from a present time (e.g. at or within three hours, twelve hours, one day, five days, two weeks, etc. from the current time) by analyzing the exercise pattern and/or current or recent information about user activity. The probable future activity event can be associated with a location, time, condition and/or situation (e.g., the future activity likely occurs following a certain type of event, such as after the user performs another activity) and other contextual data than can be used to facilitate an improved user experience. Further, as described previously, in some embodiments, the user activity pattern, or an inferred user intent or predictions of future activity determined therefrom, may be made available to one or more applications and services that consume this information and provide an improved user experience, such as activity pattern consumers 270, 271, 372 or 373, described in connection to FIGS. 2 and 3. For example, in an embodiment a modified user experience is provided, which may include presenting (or withholding, or delaying) content to the user in a manner that is personalized, such as described in connection to content personalization engine 271 of System 200 (FIG. 2).

In some embodiments, a cloud system (such as the cloud system described above) and/or a cloud service may be utilized to perform method 400 so as to provide a improved or enhanced user experiences (such as personalized content) to multiple services, which may be running on many different user devices. As such, system 200 can save significant processing, bandwidth, storage, and computing resources by centralizing certain functionality. For example, user-data collection component 210 (FIG. 2) can accumulate user data and interpretive data for multiple users or user devices, such that each user device does not require separate and redundant data collection and storage. Additionally, the processing and storage of user profile data can be made more secure by being disassociated from the user device, which is closely tied to the user.

Figure 5:
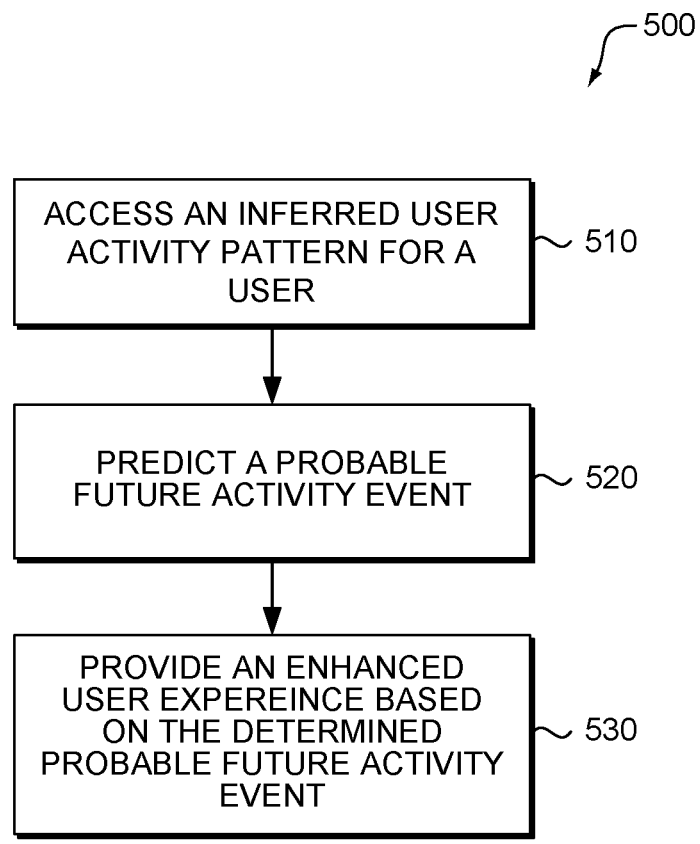
FIG. 5 depicts a flow diagram of a method for determining a probable future user action based on a pattern of user activity, in accordance with an embodiment of the present disclosure.

With reference now to FIG. 5, a flow diagram is provided illustrating one example method 500 for determining a probable future user action based on a pattern of user activity is provided. At step 510 an inferred activity pattern for a user is accessed. The inferred exercise pattern may be determined as described previously with reference to FIG. 2, 3 or 4. In an embodiment, the activity pattern may be accessed from an activity pattern data store, such as inferred user routines 248 of user profile 240, described in connection to FIG. 2. As mentioned, a user may be associated with multiple activity patterns. A particular inferred pattern can be associated with a confidence level or confidence score that indicates how likely to pattern is to be followed (i.e. how likely it is that a prediction based on the pattern is correct).

At step 520, a probable future activity event is determined based on the activity pattern. Embodiments of step 530 predict a future activity event, which may include one or a series (or sequence) of future user interactions likely to occur or likely to be desired by the user to transpire. In some embodiments, step 520 may also determine a confidence score associated with the determined probable future activity indicating the likelihood that the activity event will occur or be desired by the user to occur. In some embodiments, the probable future activity may comprise a context, which may be defined by a location, time, user behavior, or other condition, and may be determined based at least in part on sensor data.

For example, in some instances, the probable future activity event is determined looking at a periodic or behavior context, which may be defined according to periodic features or behavioral features, as described previously. Thus a periodic context defines when an activity event associated with activity pattern is likely to occur. For example, if the pattern indicates a user performs a particular activity every Monday, Wednesday, and Friday then a future activity event could be determined for any Monday, Wednesday, or Friday. Similarly, a behavioral context defines contextual features present when an activity pattern is likely to occur. For example, if the pattern indicates a user performs a particular activity when visiting a certain venue, following another activity, or upon another condition manifesting (e.g., a user checks for online coupons every time he visits a particular store). The behavioral context may also be defined in the negative to identify contextual features that define exceptions to the periodic context. For example, the user may not perform certain activities on holidays or when the user is not in a hub or frequently visited venue, such as when the user is traveling or on vacation. In some embodiments wherein a confidence score is determined for the probably future activity, the confidence score may be further determined based on the context.

In some embodiments, the context may be determined based in part on a current or recently occurring activity event. In particular, in some embodiments of step 520, the probable future activity may also be determined based on a current or recently occurring user activity event. Some embodiments of step 520 may monitor one or more user devices associated with a user to detect a current or recently occurring user activity event. The detected activity event may be used for determining a particular user activity pattern relevant to a context (e.g., the user's current situation) and/or a next or future activity event in the pattern. Accordingly, the recency of the activity event detected in such embodiments of step 520 may be based on a length of time such that a context (e.g., the user's current situation) is still relevant to the activity pattern. Thus the recency may vary based on the particular activity pattern.

In some embodiments, the current or recently occurring activity event is determined based on sensor data from one or more user devices. For example, some embodiments of step 520 may comprise monitoring sensor data, using a one or more sensors associated with the set of user devices. Some embodiments of step 520 may be performed as described in step 420 of method 400, or may be carried out using user activity detector 282, described in system 200 of FIG. 2.

At step 530, based on the determined probable future activity, an enhanced user experience may be provided to the user. Embodiments of step 530 provide a enhanced user experience, which may be in the form of a tailored, modified, or personalized service for the user that is determined based at least in part on the probably future activity determined in step 520, and may further be determined based on an associated confidence score. Embodiments of step 530 may comprise providing a service to the user by one or more activity pattern consumers 270, described in connection to FIG. 2. For example, in an embodiment, the enhanced user experience comprises one of a recommendation, notification, request, or suggestion related to the probably future activity. In one embodiment, it comprises automatically carrying out actions related to the probable future activity at a time or location consistent with the inferred activity pattern. For example, where the user typically browses her bank account near the beginning of the month and copies financial information from the bank website into a spreadsheet, an embodiment of step 530 may automatically perform the operations of launching a browser, navigating to the bank website, and loading the spreadsheet file in a spreadsheet application. In some embodiments, the automated operations may be performed at an appropriate time, based on the context, such as while the user is at home using the computing device (user device) that she typically uses to access the bank website, or not while the user is driving and thus unable to benefit from the personalized user experience. Additional examples of enhanced user experiences are described herein and include, by way of example and not limitation, personalization services (e.g. providing personalized content or tailoring the delivery of content to the user, as described herein), improved speech recognition, more efficient consumption or bandwidth or power, or improved semantic understanding of the user, which may be used for performing disambiguation or other aspects of understanding input from the user.

Figure 6:
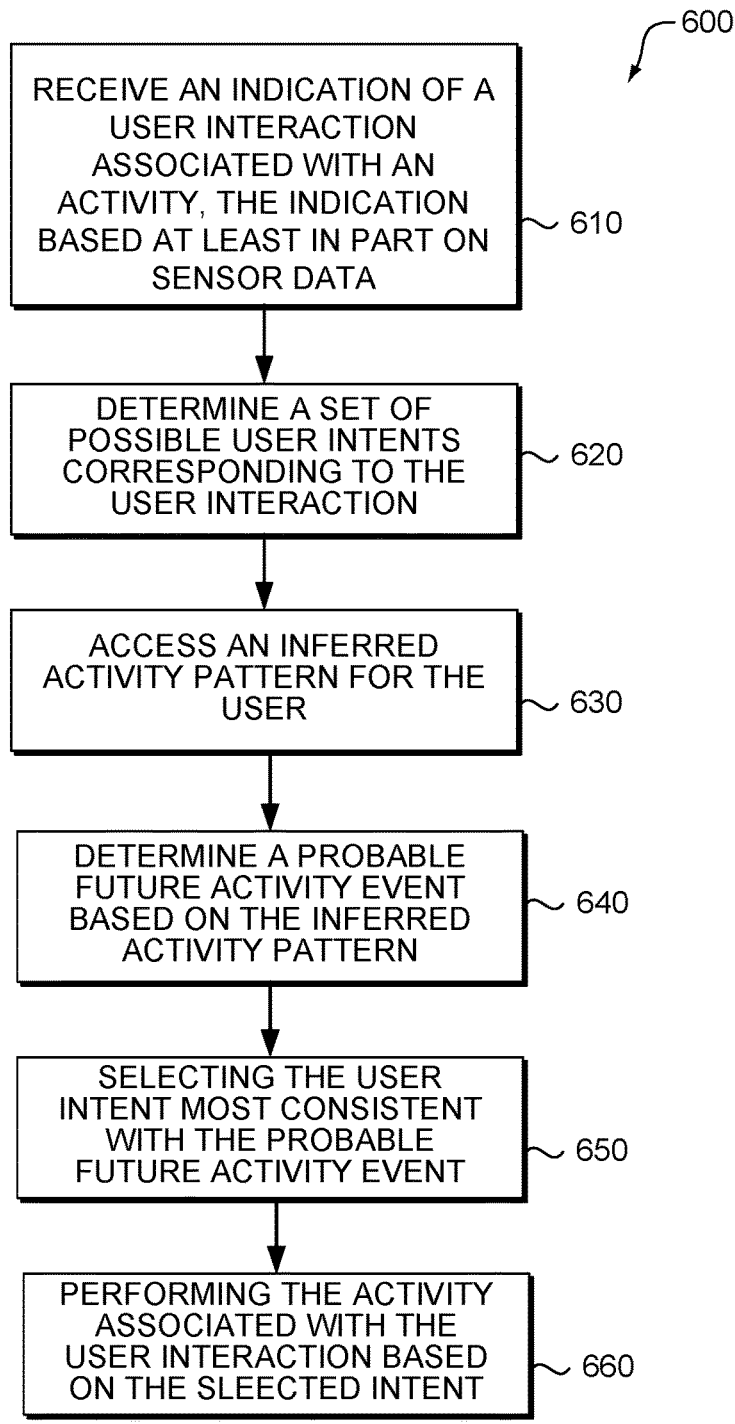
FIG. 6 depicts a flow diagram of a method performing disambiguation to determine a user intent, in accordance with an embodiment of the present disclosure.

Turning now to FIG. 6, a flow diagram is provided illustrating one example method 600 for performing disambiguation to determine a user intent is provided.

At step 610, an indication of a user interaction with a user device is received. The indication of the user interaction may be based, at least in part, on sensor data provided by one or more sensors associated with the user device. The user interaction may be associated with a particular user activity associated with a user intention (user intent), such as conducting a search query, requesting to initiate a call (or email, instant message, other communication) with someone, or issuing a voice command, for example.

At step 620, a set of possible user intentions associated with the user interaction are determined. Embodiments of step 620 identify a set of possible user intentions that make it necessary to perform disambiguation in order to determine the user's actual intent. For example, where the user interaction is related to a voice command, the set of intents may correspond to different computer-interpretations of user's utterance (e.g., whether the spoke "CNN.com" and thus intends to navigate to the news website, or spoke "CMN.com and intends to navigate to the Consumer Media Network website). Similarly, where the user is performing a search query, the user's intent for the search results (e.g., where the user's search terms are R.E.M., whether the user intends to search on the music band or REM sleep).

At step 630, an inferred user activity pattern is accessed. Embodiments of step 630 may access the inferred user activity pattern as described in step 510 of method 500. Further, the particular inferred user activity pattern that is accessed may be determined based on a context, such as described in step 520. In particular, the context may be determined according to the location, time, user behavior or activity related to the user's current situation and/or the indicated user interaction in step 610. In some embodiments of step 630, a plurality of user activity patterns are accessed. Each user activity pattern may include an associated confidence score reflecting a likelihood that the pattern will be followed, as described herein.

At step 640, a probable future activity event is determined based on the activity pattern determined in step 630. Some embodiments of step 640 further determine the probably future activity event based on the context described in connection to step 630. Some embodiments of step 640 may be performed as described in step 520 of method 500.

At step 650, select the user intent that is most consistent with the probably future activity. Embodiments of step 650 determine the user intention, from the set of possible user intents determined in step 620, that is most consistent with the probably future activity. In particular, consistency may be determined by conducting an analysis to determine whether carrying out an operation according to each intention in the set of intents will result in activity having activity features in common with the activity pattern accessed in step 630. For example, suppose a user has a habit of browsing calling family members while driving home from work, the user has a brother and several friends named Pat, and issues a voice command to "call Pat." The context indicates that the user is driving, has just left his office, and it is the end of the workday. Accordingly, the set of intents includes call an intention to call each of the user's contacts named Pat. But only one of these intentions—calling the brother, is consistent with the user's activity pattern of calling family members while driving home from work. Therefore, this intention would be selected. In this way, disambiguation is performed.

In some embodiments, the set of possible user intentions determined in step 620 are ranked in step 650 according to consistency with a probable future activity. In particular, in some embodiment of method 600, more than one user activity pattern is accessed, with each pattern having an associated confidence score, the set of possible user intentions may be ranked according to likelihood of being the correct user intention. The highest ranked intention then may be selected in step 650 and used in step 660.

At step 660, an activity associated with the user interaction is performed based on the selected intent. Embodiments of step 660 carry out the user activity associated with the user intention selected in step 650. Thus for example, continuing the example described in step 650, the activity comprises calling the user's brother Pat.

Accordingly, we have described various aspects of technology directed to systems and methods for inferring user intent and predicting future user activity associated with a user's computing devices, which may be used for providing an enhanced user experience. It is understood that various features, sub-combinations, and modifications of the embodiments described herein are of utility and may be employed in other embodiments without reference to other features or sub-combinations. Moreover, the order and sequences of steps shown in the example methods 400, 500, and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 9:
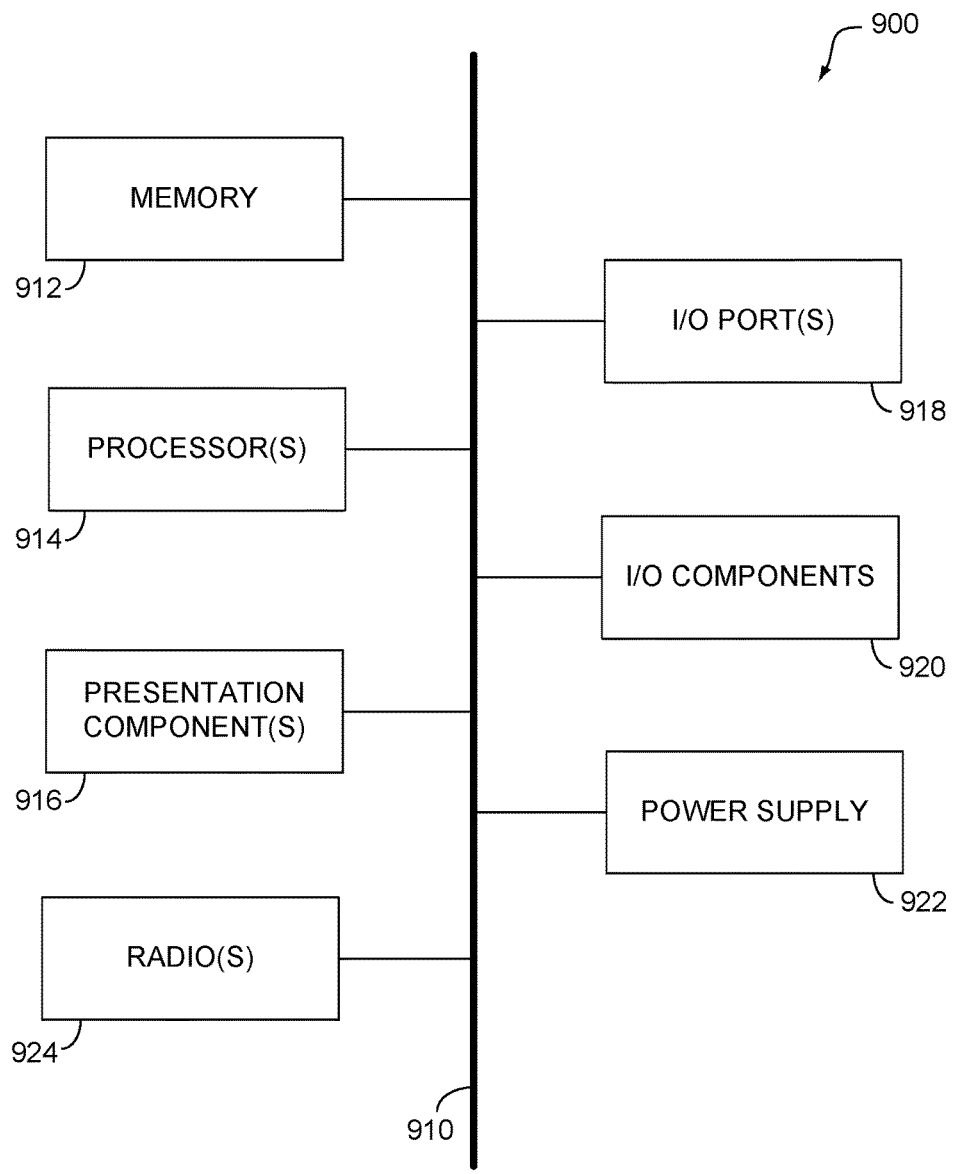
FIG. 9 is a block diagram of an exemplary computing environment suitable for use in implementing an embodiment of the present disclosure.

Having described various implementations, an exemplary computing environment suitable for implementing embodiments of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

Figure 7:
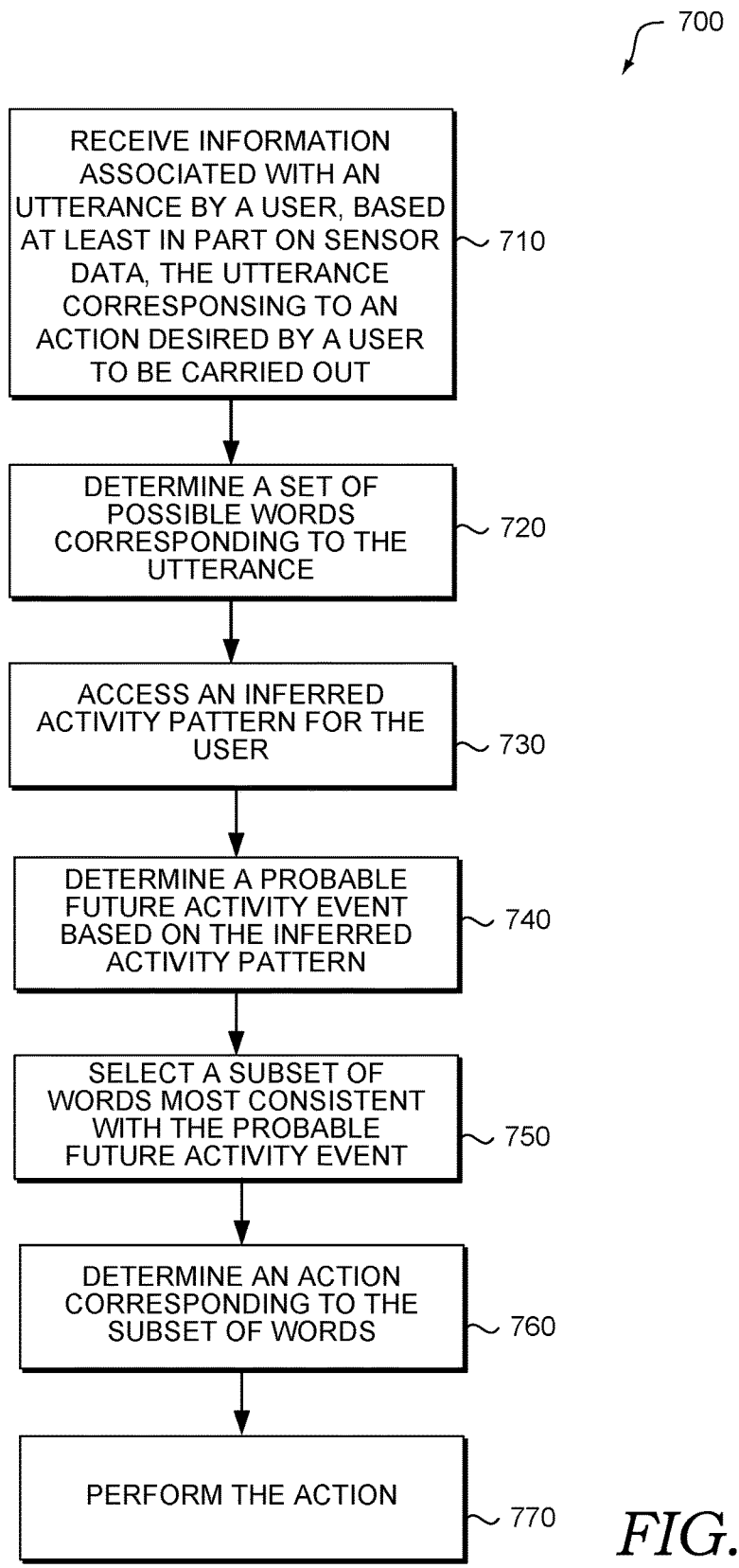
FIG. 7 depicts a flow diagram of a method performing speech recognition to determine an action that a user desires to be performed, in accordance with an embodiment of the present disclosure.

Turning now to FIG. 7, a flow diagram is provided illustrating one example method 700 for performing speech recognition to determine an action that a user desires to be performed. The user action could be a spoken request or command (e.g., "Cortana, please go to the CNN website," or "Cortana, text Ed that I'm running late."), a question or query (e.g., "Cortana, what restaurants are close to the theater?" or "Cortana how heavy is traffic right now?"), or otherwise correspond to a desire or intent of the user. At a high level, embodiments of method 700 may recognize and understand an utterance of the user associated with the action. In particular, where an ambiguity may be present based on a user's particular utterance, embodiments of method 700 may resolve the ambiguity in a manner consistent with an activity pattern for the user, and then identify an action corresponding to the now understood utterance, and perform the action. Thus, using the examples above, embodiments of method 700 may determine that a user likely uttered "CNN.com" and not "CMN.com" where the user has a pattern of viewing news-related content at the time of the utterance. Based on this understanding, a personal assistant application or service (or browser) may navigate to the CNN.com website. Similarly, where the user has an activity pattern indicating the user is likely meeting a friend named Ed, embodiments of method 700 may determine that the user likely uttered "text Ed" and not "text Ted." Similarly still, some embodiments of method 700 determine the action that a user desires to be performed based on speech recognition of a set of personalized expressions or words. For example, a user uttering "call mom" may be determined to call the particular contact of the user that the user identifies as "mom," which may be determined based on the contextual information. Further, such nicknames or personalized terms and expressions may be identified and learned from the monitored activity including contextual information extracted about the activity events, such as described in connection to contextual information extractor 284 or user activity monitor 280, of FIG. 2.

Accordingly, at step 710, information associated with an utterance by a user is received. The information may be received, based, at least in part, on sensor data provided by one or more sensors associated with a user device. The utterance may correspond to an action desired by the user to be carried out via the user device, such as conducting a search query, requesting to initiate a call (or email, instant message, other communication) with someone, or issuing a voice command, for example.

At step 720, a set of possible words corresponding to the utterance is determined. Embodiments of step 720 identify a set of words that were likely uttered by the user. In some instances, the set may include only a single word or each member of the set of words may comprise a single word, a phrase, or a series or words or phrases. Thus the set may represent the set of likely alternative utterances spoken by the user. For instance, using an example from above, the set may include {"text Ed", "text Ted", "text Red", "texted", etc.}. In some embodiments of step 720, a context may be determined based on the set of possible words. For instance, in the previous example, the context may comprise the user texting or communicating with another person. In some embodiments, the context may be determined as described in connection to contextual information extractor 284 in FIG. 2.

At step 730, an inferred user activity pattern is accessed. Embodiments of step 730 may access the inferred user activity pattern as described in step 510 of method 500 or 630 of method 600. Further, the particular inferred user activity pattern that is accessed may be determined based on a context, such as described in step 520. In particular, the context may be determined according to the location, time, user behavior or activity related to the user's current situation and/or the information associated with the utterance in step 710.

At step 740, a probable future activity event is determined based on the activity pattern determined in step 730. Some embodiments of step 740 further determine the probably future activity event based on the context described in connection to step 730. Some embodiments of step 740 may be performed as described in step 520 of method 500.

At step 750, select a subset of words most consistent with the probable future activity event. Embodiments of step 750 determine the words most likely spoken by the user, from the set of possible spoken words determined in step 720, most consistent with the probable future activity determined in step 750. In particular, consistency may be determined by conducting an analysis to determine whether carrying out an operation according to each action associated with the set of words will result in an action having activity features in common with the activity pattern accessed in step 730. For example, suppose a user has a habit of calling family members while driving home from work, the user has a brother named Pat and a friend named Matt, and issues a voice command to "call Pat." The context indicates that the user is driving, has just left his office, and it is the end of the workday. Accordingly, the set of words corresponding to the user's utterance includes at least "call Pat" and "call Matt." But only one of these—calling the brother, is consistent with the user's activity pattern of calling family members while driving home from work. Therefore, this subset of words (i.e., "call Pat") would be selected. In this way, more accurate resolution of speech is performed.

At step 760, an action corresponding to the subset of words is determined. Embodiments of step 760 determine an action corresponding to the subset of words determined in step 750. The action may comprise one or more services, processes, routines, functions, or similar activity performed or facilitated by a user device, or initiating a control signal to cause a component to carry out the action. For instance, in the previous example, the action comprises initiating a call to Pat (or initiating a control signal for a communication component on a phone to call Pat). Without limitation, other examples of actions determined in step 760 may comprise other communication (e.g. texting, emailing, instant messaging, posting, etc., which may also include composing or creating the content for the communication, such as drafting an email message) performing a query, launching an application, navigating to a website, playing a particular multimedia content, controlling operation of a device, service, routine, or function, performing a command, request, or any other action capable of being performed or facilitated via a user device. In some embodiments, of step 760, the action is determined from a set or library of actions that the user device is capable of performing or facilitating.

At step 770, perform the action determined in step 760. Embodiments of step 770 carry out an action corresponding to the subset of words determined in step 750. Thus for example, continuing the example described in step 750, the action comprises initiating a phone call the user's brother Pat. Some embodiments of step 770 comprise initiating a control signal to facilitate performing the action. For instance, where a user asks to turn on the lights, or adjust the thermostat to be warmer, step 770 may initiate a control signal (or request or similar communication specifying the action) to a light-controller component or smart thermostat.

Figure 8:
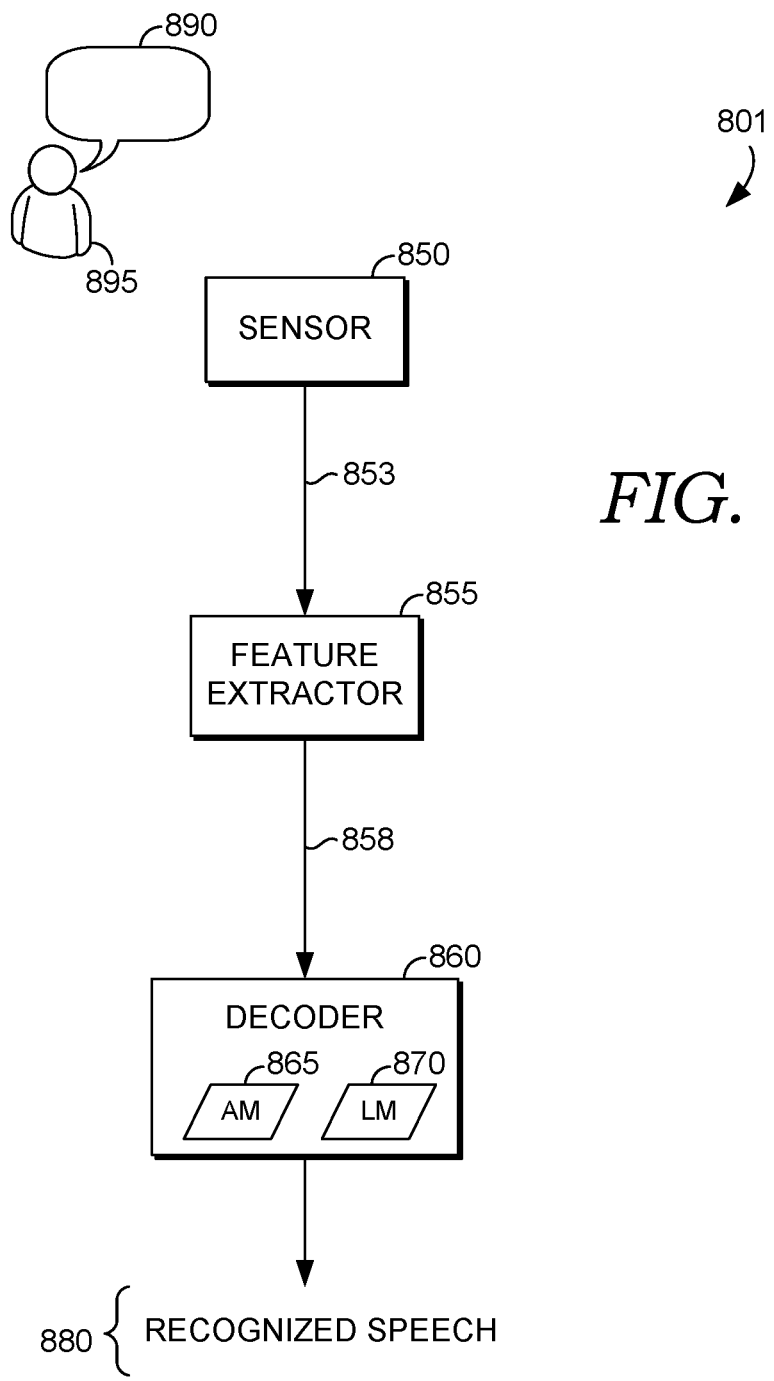
FIG. 8 depict aspects the computing architecture for an automatic speech recognition system suitable for implementing an embodiment of the present disclosure.

Turning now to FIG. 8, a perspective 801 is illustratively provided that depicts an example of a computer-performed speech recognition (or automatic speech recognition (ASR)) and understanding system according to an embodiment of the disclosure. The ASR system shown in FIG. 8 is just one example of an ASR system that is suitable for use with an embodiment of the disclosure for determining recognized speech. It is contemplated that other variations of ASR systems or spoken language understanding (SLU) systems (not shown) may be used including ASR systems that include fewer components than the example ASR system shown here, or additional components not shown in FIG. 8.

Perspective 801 shows a sensor 850 that senses acoustic information (audibly spoken words or speech 890) provided by a user-speaker 895. Sensor 850 may comprise one or more microphones or acoustic sensors, which may be embodied as sensor 103a or 107, or on a user device, such as user devices 102 or 104, described in FIG. 1. Sensor 850 converts the speech 890 and into acoustic signal information 853 that maybe provided to a feature extractor 855 (or may be provided directly to decoder 860, in some embodiments). In some embodiments, the acoustic signal may undergo pre-processing (not shown) before feature extractor 855. Feature extractor 855 generally performs feature analysis to determine the parameterize useful features of the speech signal while reducing noise corruption or otherwise discarding redundant or unwanted information. Feature extractor 855 transforms the acoustic signal into a features 858 (which may comprise a speech corpus) appropriate for the models used by decoder 860.

Decoder 860 comprises one or more acoustic models (AM) 865 and language models (LM) 870. In embodiments of the disclosure implemented in connection to an ASR (or SLU) system, a particular embodiment may be implemented as a subcomponent of decoder 860, LM 870, AM 865, or as a separate component (not shown) in the example ASR (or SLU) system.

AM 865 comprises statistical representations of distinct sounds that make up a word, which may be assigned a label called a "phenome." AM 865 models the phenomes based on the speech features and provides to LM 870 a corpus or set of words, which may comprise a sequence of words corresponding to the speech corpus, or in some instances a set of alternative sequences, each corresponding to possible utterances by the user-speaker 895. LM 870 receives the corpus of words, and determines a recognized speech 880, which may comprise a subset of words (which may be a single word, phrase, or plurality of words or phrases), including one interpretation (or recognition) of the utterance, from a set of alternative interpretations (or recognitions). In this way, a subset of words representing a likely utterance spoken by a user may be determined.

Accordingly, we have described various aspects of technology directed to systems and methods for inferring user intent and predicting future user activity associated with a user's computing devices, which may be used for providing an enhanced user experience. It is understood that various features, sub-combinations, and modifications of the embodiments described herein are of utility and may be employed in other embodiments without reference to other features or sub-combinations. Moreover, the order and sequences of steps shown in the example methods 400, 500, 600, and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

Having described various implementations, an exemplary computing environment suitable for implementing embodiments of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of embodiments of the disclosure. Neither should the computing device 900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. In some implementations presentation component 220 of system 200 may be embodied as a presentation component 916. Other examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Accordingly, in one aspect, an embodiment of the present disclosure is directed to a computerized system comprising one or more sensors configured to provide sensor data; a user activity monitor configured to identify and monitor a user device and user activity associated with the user device; an activity pattern inference engine configured to determine an activity pattern from a plurality of activity events; one or more processors; and computer storage memory having computer-executable instructions stored thereon which, when executed by the processor, implement a method of inferring a user activity pattern. The method includes (a) identifying a set of user devices associated with a user; (b) monitoring, using the user activity monitor, the set of user devices to detect a user activity event; (c) upon detecting a user activity event, determining a set of activity features associated with the activity event, the set of activity features determined based at least in part on the sensor data; (d) storing a record of the activity event and associated activity features in an activity event data store that comprises records of a plurality of activity events; (e) using the activity pattern inference engine to identify an activity pattern based on an analysis of the plurality of activity events to determine a set of activity events having similar activity features; and (f) storing a description of the activity pattern in an activity pattern data store.

In some embodiments of this system, the activity event comprises one or more of browsing to a website, launching an application, initiating a communication, performing a search query, setting a reminder, or scheduling an event on a calendar and the set of associated activity features comprise one or more features related to content associated with the activity event (a content feature), date or time of the activity event (date-time feature), location of the activity event (location feature), device-usage related features associated with the activity event (device-usage feature), or contextual information associated with the activity event. Further, in some embodiments, the activity features are determined to be similar based on a comparison of the same category of activity features using a similarity threshold that is pre-determined according to the category of the compared activity features, the categories comprising, by way of example and not limitation, content features, date-time features, location features, device-usage features, or other types of activity features described herein.

In another aspect, an embodiment of the present disclosure is directed to a computerized system comprising one or more sensors configured to provide sensor data; one or more processors; and computer storage memory having computer-executable instructions stored thereon which, when executed by the processor, implement a method of inferring a probable future user action. The method includes: (a) accessing an inferred user activity pattern for a user; (b) predicting a probable future activity event based on the activity pattern and a context determined at least in part from the sensor data; and (c) providing an enhanced user experience based on the determined probable future activity event.

In one embodiment of this system, the provided enhanced user experience comprises one of a recommendation, notification, request, or suggestion related to the probably future activity. In another embodiment, the provided enhanced user experience comprises automatically carrying out the probable future activity at a time or location consistent with the inferred user activity pattern. In yet another embodiment, the predicted probable future activity event comprises connecting, at a future time, a user device having a battery to a power source to charge the battery, and the enhanced user experience comprises a battery power management service that reduces power consumption by the user device based on the future time.

In still another embodiment of this system, the provided enhanced user experience comprises a speech recognition service, and at least one of the one or more sensors comprises an acoustic sensor on a user device configured to convert speech into acoustic information. The method for the speech recognition service embodiment further comprises (i) receiving acoustic information corresponding to a spoken interaction with the user device by a user; (ii) based on an analysis of the acoustic information, determining a plurality of word sequences corresponding to the spoken interaction; (iii) selecting the word sequence that is most consistent with the predicted probable future activity event; and (iv) providing the selected word sequence as recognized speech corresponding to the spoken interaction.

In yet another aspect, an embodiment of the disclosure is directed to a method for performing disambiguation to determine a user intent for a user. The method comprises: (a) receiving an indication of a user interaction with a user device, the user interaction associated with an activity performed by the user device, the indication based at least in part on sensor data from one or more sensors associated with the user device; (b) determining a set of possible user intents corresponding to the user interaction; (c) accessing an inferred activity pattern for the user; (d) determining a probable future activity event based on the inferred activity pattern; (e) selecting, from the set of possible user intents, the user intent that is most consistent with the probable future activity event; and (f) performing the activity associated with the user interaction based on the selected intent. In some embodiments of this method, the activity associated with the user interaction comprises a search query, and further comprising filtering search results to be provided to the user based on the selected user intent.

What is claimed is:

1. A computerized system comprising:
   one or more sensors configured to provide sensor data comprising at least acoustic information;
   one or more processors; and
   computer storage memory having computer-executable instructions stored thereon which, when executed by the processor, implement a method of recognizing speech, the method comprising:
   a) receiving from the sensor data, information associated with an utterance by a user, the utterance corresponding to an action desired by the user;
   b) determining a set of words corresponding to the utterance;
   c) accessing an user activity pattern for the user;
   d) determining a probable future activity event based on the activity pattern and a context determined at least in part from the set of words;
   e) determining from the set of words, a subset of words based on the determined probable future activity event;
   f) determining an action corresponding to the subset of words;
   and
   g) generating a control signal to initiate the action.

2. The computerized system of claim 1, wherein the subset of words is determined to be consistent with the determined probable future activity event.

3. The computerized system of claim 1, wherein the activity event comprises one or more of browsing to a website, launching an application, initiating a communication, performing a search query, setting a reminder, or scheduling an event on a calendar.

4. The computerized system of claim 1, wherein the set of words comprises a plurality of alternative subsets of words, each subset corresponding to an alternative possible user action.

5. The computerized system of claim 1, wherein the user is provided an indication of the determined subset of words.

6. The computerized system of claim 1, further comprising determining the action based in part on the probable future activity event.

7. The computerized system of claim 1, wherein the sensor data further comprises one or more of location-related data, time-related data, usage-related data, or data about the user, and wherein the context is further determined based on the location-related data, the time-related data, the usage-related data, or the data about the user.

8. The computerized system of claim 1, wherein the utterance comprises a spoken request, command, or query to be performed via a user computing device.

9. A method for performing disambiguation to determine a user intent for a user, comprising:
   receiving an indication of a user interaction with a user device, the user interaction associated with an activity performed by the user device, the indication based at least in part on sensor data from one or more sensors associated with the user device;
   determining a set of possible user intents corresponding to the user interaction;
   accessing an activity pattern that is learned for the user;
   determining a future activity event based on the activity pattern that is learned for the user;
   determining from the set of possible user intents, a particular user intent based on the future activity event; and performing the activity associated with the user interaction based on the determined particular user intent.

10. The method of claim 9, wherein the activity associated with the user interaction comprises a search query, and further comprising filtering search results to be provided to the user based on the selected user intent.

11. The method of claim 9, wherein determining a particular user intent comprises determining from the set of intents, the intent that is most consistent with the determined probable future activity event.

12. The method of claim 9, wherein the sensor data comprises acoustic information corresponding to an utterance spoken by the user.

13. The method of claim 9, wherein the future activity event is further determined based on a context associated with the user interaction.

14. The method of claim 13, wherein the context is determined based on the sensor data.

15. A computerized system comprising:
one or more sensors configured to provide sensor data, each sensor associated with a user device in a set of user devices associated with a user, at least one of the one or more sensors comprising an acoustic sensor configured to convert speech into acoustic information;
one or more processors; and
computer storage memory having computer-executable instructions stored thereon which, when executed by the processor, implement a method of recognizing speech, the method comprising:
a) accessing an user activity pattern that is learned for a user;
b) predicting a future activity event based on the activity pattern that is learned for the user and a context determined at least in part from the sensor data;
c) receiving, from the acoustic sensor, acoustic information corresponding to a spoken interaction with a particular user device by the user;
d) based on an analysis of the acoustic information, determining a plurality of word sequences corresponding to the spoken interaction;
e) determining from the plurality of word sequences, a word sequence based on the predicted future activity event; and
f) providing the determined word sequence as recognized speech corresponding to the spoken interaction.

16. The computerized system of claim 15, further causing to be performed an action corresponding to the spoken interaction.

17. The computerized system of claim 15, determining the word sequence based on the predicted future activity event comprises determining the word sequence that is most consistent with the predicted future activity event.

18. The computerized system of claim 15, wherein the predicted future activity event comprises a sequence of user actions.

19. The computerized system of claim 15, wherein the sensor data for predicting a future activity event is provided from a sensor associated with a first user device in the set of user devices that is different from the particular user device that receives acoustic information.

20. The computerized system of claim 15, wherein the sensor data includes one or more of location-related data, time-related data, usage-related data, or data about the user, and wherein the context is further determined based on the location-related data, the time-related data, the usage-related data, or the data about the user.

* * * * *